United States Patent
Gao et al.

(10) Patent No.: US 9,844,069 B2
(45) Date of Patent: Dec. 12, 2017

(54) DUAL BAND ADAPTIVE CONCURRENT PROCESSING METHOD AND APPARATUS

(71) Applicant: Huawei Technologies Co., Ltd., Shenzhen (CN)

(72) Inventors: Lin Gao, Shenzhen (CN); Wenjun Li, Shenzhen (CN); Yuan Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 14/821,419

(22) Filed: Aug. 7, 2015

(65) Prior Publication Data
US 2016/0044705 A1  Feb. 11, 2016

(30) Foreign Application Priority Data
Aug. 7, 2014  (CN) .......................... 2014 1 0387978

(51) Int. Cl.
*H04W 4/00*  (2009.01)
*H04W 72/12*  (2009.01)
(Continued)

(52) U.S. Cl.
CPC ....... *H04W 72/1263* (2013.01); *H04W 28/24* (2013.01); *H04W 48/18* (2013.01);
(Continued)

(58) Field of Classification Search
CPC ......... H04W 72/1236; H04W 72/1263; H04W 48/18; H04W 28/24; H04W 72/00; H04W 84/12
See application file for complete search history.

(56) References Cited

U.S. PATENT DOCUMENTS

2008/0232433 A1* 9/2008 McNew ............... H04W 28/18
                                                              375/140
2013/0132603 A1* 5/2013 Cohen .................. H04L 1/1841
                                                              709/231
(Continued)

FOREIGN PATENT DOCUMENTS

CN         1287456 A      3/2001
CN       101197655 A      6/2008
(Continued)

*Primary Examiner* — Ayaz Sheikh
*Assistant Examiner* — Hai-Chang Hsiung
(74) *Attorney, Agent, or Firm* — Leydig, Voit & Mayer, Ltd.

(57) ABSTRACT

Embodiments of the present invention provide a dual band adaptive concurrent processing method and apparatus. In the embodiments of the present invention, by using statistical information of services at first and a second frequency bands in the $N^{th}$ adjustment period, performance of the services at the frequency bands in an adjustment period may be acquired. Based on the statistical information, and a quality of service (QoS) requirement that the services at the two frequency bands need to meet, a second coefficient of proportionality between timeslots occupied by the services at the two frequency bands in the $(N+1)^{th}$ adjustment period may be determined, so that switching control on first and second channels may be performed in the $(N+1)^{th}$ adjustment period according to the determined second coefficient of proportionality.

12 Claims, 6 Drawing Sheets

(51) Int. Cl.
*H04W 28/24* (2009.01)
*H04W 48/18* (2009.01)
*H04W 84/12* (2009.01)
*H04W 72/00* (2009.01)

(52) U.S. Cl.
CPC ........ *H04W 72/1236* (2013.01); *H04W 72/00* (2013.01); *H04W 84/12* (2013.01)

(56) References Cited

U.S. PATENT DOCUMENTS

2013/0315141 A1* 11/2013 Homchaudhuri ..... H04W 88/06 370/328
2014/0185580 A1* 7/2014 Fang .................... H04W 16/14 370/330

FOREIGN PATENT DOCUMENTS

| | | |
|---|---|---|
| CN | 103841623 A | 6/2014 |
| CN | 104125615 A | 10/2014 |
| EP | 1073217 A2 | 1/2001 |

* cited by examiner

DUAL BAND ADAPTIVE CONCURRENT PROCESSING METHOD AND APPARATUS

CROSS-REFERENCE TO RELATED APPLICATION

This application claims priority to Chinese Patent Application No. 201410387978.8, filed on Aug. 7, 2014, which is hereby incorporated by reference in its entirety.

TECHNICAL FIELD

Embodiments of the present invention relate to communications technologies, and in particular, to a dual band adaptive concurrent processing method and apparatus.

BACKGROUND

Based on supported frequency bands and concurrent manners of different frequency bands, existing wireless local area network (WLAN) devices may be classified into the following types: single band single concurrent (SBSC for short) device, dual band single concurrent (DBSC for short) device, and dual band dual concurrent (DBDC for short) device. The SBSC device integrates one set of a media access control layer/a physical layer/a radio frequency (MAC/PHY/RF for short), where the RF has only one channel and can work at only one frequency band, which is generally a 2.4 GHz frequency band. The DBSC device integrates one set of MAC/PHY/RF, where the RF has two channels: One channel supports 2.4 GHz, and the other channel supports 5 GHz. The RF may switch to either of the frequency bands 2.4 GHz and 5 GHz for use, but cannot support simultaneous work at the two frequency bands. The DBDC device integrates two sets of MAC/PHY/RF, and the RFs work separately at 2.4 GHz and 5 GHz, and can work simultaneously at both 2.4 GHz and 5 GHz frequency bands. Because a cost of the DBDC device is high, in the prior art, the DBSC device is used to implement dynamic switching between 2.4 GHz and 5 GHz, so as to achieve a communication effect of time division multiplexing at the two frequency bands. This manner may be referred to as dual band adaptive concurrent (DBAC for short).

However, when the DBAC manner is used in the prior art to implement switching between the 2.4 GHz and 5 GHz frequency bands, a problem of service quality deterioration frequently occurs.

SUMMARY

Embodiments of the present invention provide a dual band adaptive concurrent processing method and apparatus.

According to a first aspect, a dual band adaptive concurrent processing method is provided, where the method is applied to a wireless broadband WLAN device, the WLAN device includes a first channel for transmitting a service at a first frequency band and a second channel for transmitting a service at a second frequency band, and the method includes:

separately acquiring statistical information of the service at the first frequency band and the service at the second frequency band in the $N^{th}$ adjustment period, where the statistical information indicates service performance of the services at the frequency bands in the adjustment period, and N is a natural number;

determining, according to the statistical information, and a quality of service (QoS) requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period; and performing switching control on the first channel and the second channel in the $(N+1)^{th}$ adjustment period according to the determined second coefficient of proportionality, so that a ratio between communicating timeslots of the first channel and timeslots of the second channel in the $(N+1)^{th}$ adjustment period is equal to the second coefficient of proportionality.

In a first implementation manner of the first aspect, if both the service at the first frequency band and the service at the second frequency band that are transmitted by the WLAN device are voice services, the statistical information includes a maximum voice service scheduling delay; and the determining, according to the statistical information, and a QoS requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period includes:

determining whether both a maximum voice service scheduling delay of the service at the first frequency band and a maximum voice service scheduling delay of the service at the second frequency band are less than a first threshold, where the first threshold is a maximum scheduling delay required by voice service quality; and if both the maximum voice service scheduling delay of the service at the first frequency band and the maximum voice service scheduling delay of the service at the second frequency band are less than the first threshold, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether a difference between the maximum voice service scheduling delay of the service at the first frequency band and the maximum voice service scheduling delay of the service at the second frequency band is less than a preset second threshold; if the difference is less than the second threshold, determining that the second coefficient of proportionality is equal to the first coefficient of proportionality; and if the difference is greater than or equal to the second threshold, on a basis of the first coefficient of proportionality, increasing a timeslot percentage corresponding to the service at the first frequency band by a first step and reducing a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band.

In a second implementation manner of the first aspect, if both the service at the first frequency band and the service at the second frequency band that are transmitted by the WLAN device are video services, the statistical information includes a maximum video service scheduling delay; and the determining, according to the statistical information, and a QoS requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period includes:

determining whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether a difference between the maximum video service scheduling delay of the service at the first frequency band and the maximum video service scheduling delay of the service at the second frequency band is less than a preset fourth threshold; if the difference is less than the fourth threshold, determining that the second coefficient of proportionality is equal to the first coefficient of proportionality; and if the difference is greater than or equal to the fourth threshold, on a basis of the first coefficient of proportionality, increase a timeslot percentage corresponding to the service at the first frequency band by a second step and reduce a timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

In a third implementation manner of the first aspect, if both the service at the first frequency band and the service at the second frequency band that are transmitted by the WLAN device are data services, the statistical information includes a quantity of low-bandwidth data service users; and the determining, according to the statistical information, and a QoS requirement that the service at the first frequency band and the service at the second frequency band need to meet, the second coefficient of proportionality between timeslots occupied by the service at the first frequency band and timeslots occupied by the service at the second frequency band in the $(N+1)^{th}$ adjustment period includes:

determining whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether the quantity of low-bandwidth data service users of the service at the first frequency band is equal to the quantity of low-bandwidth data service users of the service at the second frequency band;

if the quantity of low-bandwidth data service users of the service at the first frequency band is equal to the quantity of low-bandwidth data service users of the service at the second frequency band, determining that the second coefficient of proportionality is equal to the first coefficient of proportionality; and if the quantity of low-bandwidth data service users of the service at the first frequency band is not equal to the quantity of low-bandwidth data service users of the service at the second frequency band, on a basis of the first coefficient of proportionality, increasing the timeslot percentage corresponding to the service at the first frequency band by a third step and reducing the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

In a fourth implementation manner of the first aspect, if both the service at the first frequency band and the service at the second frequency band that are transmitted by the WLAN device include at least one service of: a voice service, a video service, and a data service, the statistical information includes a maximum voice service scheduling delay, a maximum video service scheduling delay, a quantity of low-bandwidth data service users, and a total uplink and downlink throughput; and the determining, according to the statistical information, and a QoS requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period includes:

S201. determining whether maximum voice service scheduling delays of the service at the first frequency band and the service at the second frequency band are less than a first threshold, where the first threshold is a maximum scheduling delay required by voice service quality; and if both the maximum voice service scheduling delays of the service at the first frequency band and the service at the second frequency band are less than the first threshold, performing S205; otherwise, performing S202;

S202. determining whether a difference between the maximum voice service scheduling delays of the service at the first frequency band and the service at the second frequency band is less than a preset second threshold; and if the difference is less than the second threshold, performing S203; otherwise, performing S204;

S203. determining that the second coefficient of proportionality is equal to a first coefficient of proportionality, where the first coefficient of proportionality indicates ratios of timeslots occupied by the service at the first frequency band and the service at the second frequency band in the $N^{th}$ adjustment period;

S204. on a basis of the first coefficient of proportionality, increasing a timeslot percentage corresponding to the service at the first frequency band by a first step and reducing a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band;

S205. determining whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, performing S208; otherwise, performing S206;

S206. determining whether a difference between the maximum video service scheduling delay of the service at the first frequency band and the maximum video service scheduling delay of the service at the second frequency band is less than a preset fourth threshold; and if the difference is less than the fourth threshold, performing S203; otherwise, performing S207;

S207. on a basis of the first coefficient of proportionality, increasing the timeslot percentage corresponding to the service at the first frequency band by a second step and reducing the timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band;

S208. determining whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, performing S211; otherwise, performing S209;

S209. determining whether the quantity of low-bandwidth data service users of the service at the first frequency band is equal to the quantity of low-bandwidth data service users of the service at the second frequency band; and if the quantity of low-bandwidth data service users of the service at the first frequency band is equal to the quantity of low-bandwidth data service users of the service at the second frequency band, performing S203; otherwise, performing S210;

S210. on a basis of the first coefficient of proportionality, increasing the timeslot percentage corresponding to the service at the first frequency band by a third step and reducing the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band;

S211. determining whether a difference between total uplink and downlink throughputs of the service at the first frequency band and the service at the second frequency band is less than a preset fifth threshold; and if the difference is less than the fifth threshold, performing S203; otherwise, performing S212; and S212. on a basis of the first coefficient of proportionality, increasing the timeslot percentage corresponding to the service at the first frequency band by a fourth step and reducing the timeslot percentage corresponding to the service at the second frequency band by the fourth step, so as to obtain the second coefficient of proportionality, where the total uplink and downlink throughput of the service at the first frequency band is greater than the total uplink and downlink throughput of the service at the second frequency band.

In a fifth implementation manner of the first aspect, if the service at the first frequency band and the service at the second frequency band that are transmitted by the WLAN device are data forwarding services, the statistical information includes a downlink data volume $R_{down}$ received from an access point (AP) at the first frequency band, a data volume $L_{down}$ temporarily stored in a downlink sending queue, an uplink data volume $R_{up}$ received from a STA at the second frequency band, and a data volume $L_{up}$ temporarily stored in an uplink sending queue; and the determining, according to the statistical information, and a QoS requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period includes:

determining an uplink and downlink service accumulation situation according to $L_{down}$ and $L_{up}$, where if MAX $\{L_{up}, L_{down}\} < P_{TH}$, it is determined that there is no service accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, where $P_{TH}$ is a preset threshold, and $A_{TH}$ is a preset value in a value range of $(0,1)$;

if there is service accumulation only in downlink, on a basis of a first coefficient of proportionality, increasing a timeslot percentage corresponding to the service at the first frequency band by a fifth step and reducing a timeslot percentage corresponding to the service at the second frequency band by the fifth step, so as to obtain the second coefficient of proportionality, where the first coefficient of proportionality indicates ratios of timeslots occupied by the service at the first frequency band and the service at the second frequency band in the $N^{th}$ adjustment period;

if there is service accumulation only in uplink, on a basis of the first coefficient of proportionality, increasing the timeslot percentage corresponding to the service at the second frequency band by a sixth step and reducing the timeslot percentage corresponding to the service at the first frequency band by the sixth step, so as to obtain the second coefficient of proportionality;

if there is service accumulation in both uplink and downlink, determining that the second coefficient of proportionality is equal to the first coefficient of proportionality;

if there is no service accumulation in uplink and downlink, comparing uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increasing the timeslot percentage corresponding to the service at the first frequency band by the fifth step and reducing the timeslot percentage corresponding to the service at the second frequency band by the fifth step, so as to obtain the second coefficient of proportionality;

if a value of the uplink receiving data volume minus the downlink receiving data volume is greater than or equal to the first difference, on a basis of the first coefficient of proportionality, increasing the timeslot percentage corresponding to the service at the second frequency band by the sixth step and reducing the timeslot percentage corresponding to the service at the first frequency band by the sixth step, so as to obtain the second coefficient of proportionality; and if an absolute value of the difference between the uplink receiving data volume and the downlink receiving data volume is less than the first difference, determining that the second coefficient of proportionality is equal to the first coefficient of proportionality.

According to a second aspect, a dual band adaptive concurrent processing apparatus is provided, where the apparatus is applied to a wireless broadband WLAN device, the WLAN device includes a first channel for transmitting a service at a first frequency band and a second channel for transmitting a service at a second frequency band, and the apparatus includes:

an acquiring module, configured to separately acquire statistical information of the service at the first frequency band and the service at the second frequency band in the $N^{th}$ adjustment period, where the statistical information indicates service performance of the services at the frequency bands in the adjustment period, and N is a natural number;

a determining module, configured to determine, according to the statistical information, and a quality of service (QoS) requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period; and a switching control module, configured to perform switching control on the first channel and the second channel in the $(N+1)^{th}$ adjustment period according to the determined second coefficient of proportionality, so that a ratio between communicating timeslots of the first channel and timeslots of the second channel in the $(N+1)^{th}$ adjustment period is equal to the second coefficient of proportionality.

In a first implementation manner of the second aspect, if both the service at the first frequency band and the service at the second frequency band that are transmitted by the WLAN device are voice services, the statistical information includes a maximum voice service scheduling delay; and the determining module is configured to:

determine whether both a maximum voice service scheduling delay of the service at the first frequency band and a maximum voice service scheduling delay of the service at the second frequency band are less than a first threshold, where the first threshold is a maximum scheduling delay required by voice service quality; and if both the maximum voice service scheduling delay of the service at the first frequency band and the maximum voice service scheduling delay of the service at the second frequency band are less than the first threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether a difference between the maximum voice service scheduling delay of the service at the first frequency band and the maximum voice service scheduling delay of the service at the second frequency band is less than a preset second threshold; if the difference is less than the second threshold, determine that the second coefficient of proportionality is equal to the first coefficient of proportionality; and if the difference is greater than or equal to the second threshold, on a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band.

In a second implementation manner of the second aspect, if both the service at the first frequency band and the service at the second frequency band that are transmitted by the WLAN device are video services, the statistical information includes a maximum video service scheduling delay; and the determining module is configured to:

determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether a difference between the maximum video service scheduling delay of the service at the first frequency band and the maximum video service scheduling delay of the service at the second frequency band is less than a preset fourth threshold; if the difference is less than the fourth threshold, determine that the second coefficient of proportionality is equal to the first coefficient of proportionality; and if the difference is greater than or equal to the fourth threshold, on a basis of the first coefficient of proportionality, increase a timeslot percentage corresponding to the service at the first frequency band by a second step and reduce a timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

In a third implementation manner of the second aspect, if both the service at the first frequency band and the service at the second frequency band that are transmitted by the WLAN device are data services, the statistical information includes a quantity of low-bandwidth data service users; and the determining module is configured to:

determine whether both a quantity of low-bandwidth data service users of the service at the first frequency band and a quantity of low-bandwidth data service users of the service at the second frequency band are 0;

if both the quantity of low-bandwidth data service users of the service at the first frequency band and the quantity of low-bandwidth data service users of the service at the second frequency band are 0, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether the quantity of low-bandwidth data service users of the service at the first frequency band is equal to the quantity of low-bandwidth data service users of the service at the second frequency band;

if the quantity of low-bandwidth data service users of the service at the first frequency band is equal to the quantity of low-bandwidth data service users of the service at the second frequency band, determine that the second coefficient of proportionality is equal to the first coefficient of proportionality; and if the quantity of low-bandwidth data service users of the service at the first frequency band is not equal to the quantity of low-bandwidth data service users of the service at the second frequency band, on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

In a fourth implementation manner of the second aspect, if both the service at the first frequency band and the service at the second frequency band that are transmitted by the WLAN device include at least one service of: a voice service, a video service, and a data service, the statistical information includes a maximum voice service scheduling delay, a maximum video service scheduling delay, a quantity of low-bandwidth data service users, and a total uplink and downlink throughput; and the determining module is configured to:

S201. determine whether maximum voice service scheduling delays of the service at the first frequency band and the service at the second frequency band are less than a first threshold, where the first threshold is a maximum scheduling delay required by voice service quality; and if both the maximum voice service scheduling delays of the service at the first frequency band and the service at the second frequency band are less than the first threshold, perform S205; otherwise, perform S202;

S202. determine whether a difference between the maximum voice service scheduling delays of the service at the first frequency band and the service at the second frequency band is less than a preset second threshold; and if the difference is less than the second threshold, perform S203; otherwise, perform S204;

S203. determine that the second coefficient of proportionality is equal to a first coefficient of proportionality, where the first coefficient of proportionality indicates ratios of timeslots occupied by the service at the first frequency band and the service at the second frequency band in the $N^{th}$ adjustment period;

S204. on a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band;

S205. determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, perform S208; otherwise, perform S206;

S206. determine whether a difference between the maximum video service scheduling delay of the service at the first frequency band and the maximum video service scheduling delay of the service at the second frequency band is less than a preset fourth threshold; and if the difference is less than the fourth threshold, perform S203; otherwise, perform S207;

S207. on a basis of the first coefficient of proportionality, increase the timeslot percentage corresponding to the service at the first frequency band by a second step and reduce the timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band;

S208. determine whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, perform S211; otherwise, perform S209;

S209. determine whether the quantity of low-bandwidth data service users of the service at the first frequency band is equal to the quantity of low-bandwidth data service users of the service at the second frequency band; and if the quantity of low-bandwidth data service users of the service at the first frequency band is equal to the quantity of low-bandwidth data service users of the service at the second frequency band, perform S203; otherwise, perform S210;

S210. on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band;

S211. determine whether a difference between total uplink and downlink throughputs of the service at the first frequency band and the service at the second frequency band is less than a preset fifth threshold; and if the difference is less than the fifth threshold, perform S203; otherwise, perform S212; and S212. on a basis of the first coefficient of proportionality, increase the timeslot percentage corresponding to the service at the first frequency band by a fourth step and reduce the timeslot percentage corresponding to the service at the second frequency band by the fourth step, so as to obtain the second coefficient of proportionality, where the total uplink and downlink throughput of the service at the first frequency band is greater than the total uplink and downlink throughput of the service at the second frequency band.

In a fifth implementation manner of the second aspect, if the service at the first frequency band and the service at the second frequency band that are transmitted by the WLAN device are data forwarding services, the statistical information includes a downlink data volume $R_{down}$ received from an access point (AP) at the first frequency band, a data volume $L_{down}$ temporarily stored in a downlink sending queue, an uplink data volume $R_{up}$ received from a STA at the second frequency band, and a data volume $L_{up}$ temporarily stored in an uplink sending queue; and the determining module is configured to:

determine an uplink and downlink service accumulation situation according to $L_{down}$ and $L_{up}$, where if MAX $\{L_{up}, L_{down}\} < P_{TH}$, it is determined that there is no service accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, where $P_{TH}$ is a preset threshold, and $A_{TH}$ is a preset value in a value range of (0,1);

if there is service accumulation only in downlink, on a basis of the first coefficient of proportionality, increase a timeslot percentage corresponding to the service at the first frequency band by a fifth step and reduce a timeslot percentage corresponding to the service at the second frequency band by the fifth step, so as to obtain the second coefficient of proportionality, where the first coefficient of proportionality indicates ratios of timeslots occupied by the service at the first frequency band and the service at the second frequency band in the $N^{th}$ adjustment period;

if there is service accumulation only in uplink, on a basis of the first coefficient of proportionality, increase the timeslot percentage corresponding to the service at the second frequency band by a sixth step and reduce the timeslot percentage corresponding to the service at the first frequency band by the sixth step, so as to obtain the second coefficient of proportionality;

if there is service accumulation in both uplink and downlink, determine that the second coefficient of proportionality is equal to the first coefficient of proportionality;

if there is no service accumulation in uplink and downlink, comparing uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increase the timeslot percentage corresponding to the service at the first frequency band by the fifth step and reduce the timeslot percentage corresponding to the service at the second frequency band by the fifth step, so as to obtain the second coefficient of proportionality;

if a value of the uplink receiving data volume minus the downlink receiving data volume is greater than or equal to the first difference, on a basis of the first coefficient of proportionality, increase the timeslot percentage corresponding to the service at the second frequency band by the sixth step and reduce the timeslot percentage corresponding to the service at the first frequency band by the sixth step, so as to obtain the second coefficient of proportionality; and if an absolute value of the difference between the uplink receiving data volume and the downlink receiving data volume is less than the first difference, determine that the second coefficient of proportionality is equal to the first coefficient of proportionality.

In the embodiments of the present invention, by using statistical information of a service at a first frequency band and a service at a second frequency band in the $N^{th}$ adjustment period, service performance of the services at the frequency bands in the adjustment period may be acquired; and based on the statistical information, and a QoS requirement that the services at the two frequency bands need to meet, a second coefficient of proportionality between timeslots occupied by the services at the two frequency bands in the $(N+1)^{th}$ adjustment period may be determined, so that switching control on a first channel and a second channel may be performed in the $(N+1)^{th}$ adjustment period according to the determined second coefficient of proportionality, further meeting quality requirements of the services at the two frequency bands to a greatest extent and improving quality of service.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
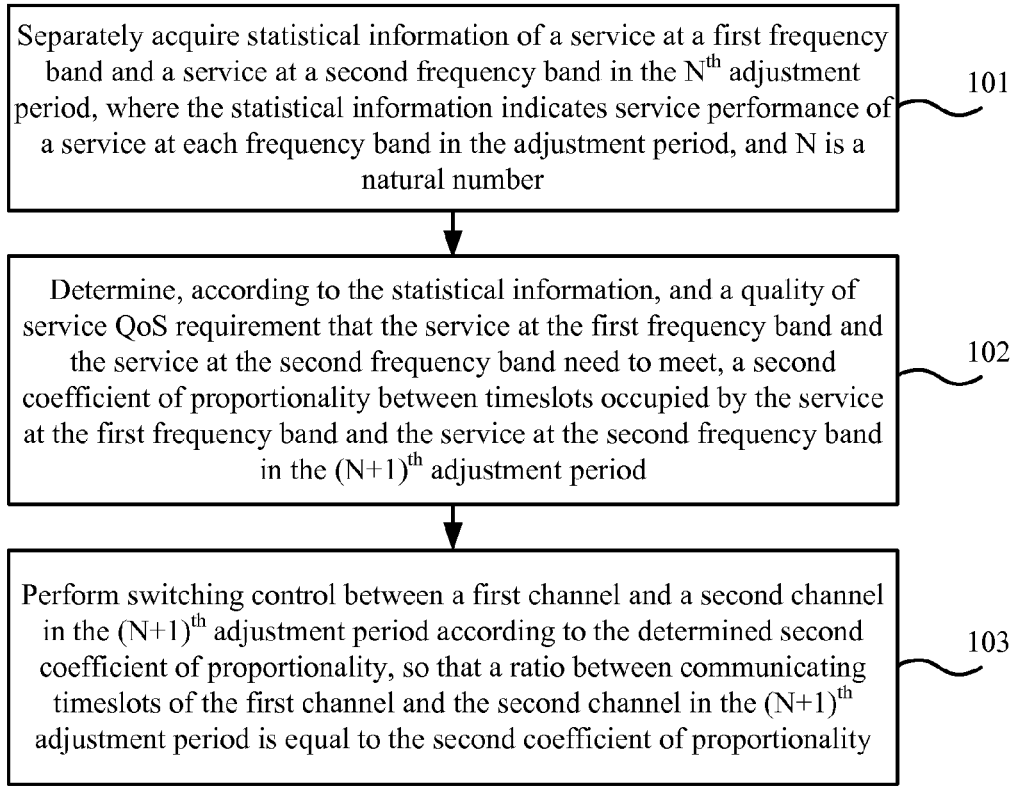
FIG. 1 is a flowchart of a dual band adaptive concurrent processing method according to Embodiment 1 of the present invention.

FIG. 1 is a flowchart of Embodiment 1 of a dual band adaptive concurrent processing method according to the present invention. The method of this embodiment, as shown in FIG. 1, is applied to a WLAN device, where the WLAN device includes a first channel for transmitting a service at a first frequency band and a second channel for transmitting a service at a second frequency band, and the method may include the following steps:

101. Separately acquire statistical information of the service at the first frequency band and the service at the second frequency band in the $N^{th}$ adjustment period, where the statistical information indicates service performance of the services at the frequency bands in the adjustment period, and N is a natural number.

102. Determine, according to the statistical information, and a quality of service (QoS) requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period.

103. Perform switching control on the first channel and the second channel in the $(N+1)^{th}$ adjustment period according to the determined second coefficient of proportionality, so that a ratio between communicating timeslots of the first channel and timeslots of the second channel in the $(N+1)^{th}$ adjustment period is equal to the second coefficient of proportionality.

That the service at the first frequency band and the service at the second frequency band are respectively a 2.4 GHz service and a 5 GHz service is used as an example for description in this embodiment. A person skilled in the art may understand that the service at the first frequency band and the service at the second frequency band may be services at other possible frequency bands, which are not limited in this embodiment.

In the prior art, when the WLAN device uses a DBAC manner to switch between a 2.4 GHz channel and a 5 GHz channel, percentages of timeslots occupied by the 2.4 GHz service and the 5 GHz service are fixed, for example, the 2.4 GHz service occupies 50% of all timeslots, and the 5 GHz service occupies 50% of all timeslots; or, the 2.4 GHz service occupies 30% of all timeslots, and the 5 GHz service occupies 70% of all timeslots. However, in actual communication, there may be various services such as a voice service, a video service, and a data service. These services all need guaranteed quality of service (QoS for short), and a fixed timeslot percentage, however, cannot meet a QoS requirement of a service. For example, the 2.4 GHz service occupies 30% of all timeslots, and the 5 GHz service occupies 70% of all timeslots. However, if a service volume of the 2.4 GHz service is relatively large, because relatively few timeslots are occupied by the 2.4 GHz service, a requirement of the 2.4 GHz service cannot be met, and a problem of service quality deterioration is usually caused.

Therefore, entire service duration of the WLAN device is divided into multiple adjustment periods in this embodiment. Each adjustment period may include an even number of timeslots. A person skilled in the art may set, according to an adjustment requirement, a time length of each adjustment period, that is, a quantity of timeslots included in each adjustment period. In each adjustment period, percentages of timeslots occupied by the service at the first frequency band and the service at the second frequency band may be dynamically adjusted. Percentages of timeslots occupied by the service at the first frequency band and the service at the second frequency band in the $(N+1)^{th}$ adjustment period may be adjusted with reference to the statistical information of the services at the two frequency bands in the $N^{th}$ adjustment period.

During initialization of the WLAN device, a default timeslot percentage may be used in the first adjustment period, where the service at the first frequency band occupies P %, and the service at the second frequency band occupies 1−P %. For example, percentages of timeslots occupied by the 2.4 GHz service and the 5 GHz service are respectively ratio_2G and ratio_5G, and ratio_2G+ratio_5G=100%. In addition, in the first adjustment period, statistical information of two frequency band service needs to be obtained by means of statistics, where the statistical information indicates service performance of the services at the frequency bands in the adjustment period. For example, the statistical information may be a voice or video service delay value, whether a data service meets minimum bandwidths, uplink and downlink throughputs of the services at the two frequency bands, data volumes of accumulated packets in sending queues of the services at the two frequency bands, and the like.

When the first adjustment period ends, a coefficient of proportionality between timeslots occupied in the second adjustment period by the services at the two frequency bands may be determined according to the statistical information of the two frequency bands service.

When the second adjustment period starts, the foregoing determined second coefficient of proportionality may be used to allocate timeslots occupied in the second adjustment period by the service at the first frequency band and the service at the second frequency band, which is that switching control on the first channel and the second channel is performed in the second adjustment period, so that a ratio between communicating timeslots of the first channel and timeslots of the second channel in the second adjustment period is equal to the second coefficient of proportionality. In addition, in the second adjustment period, the statistical information of the services at the two frequency bands also needs to be obtained by means of statistics, so that a coefficient of proportionality between timeslots occupied in the third adjustment period by the service at the first frequency band and the service at the second frequency band is determined when the second adjustment period ends.

Processing processes of subsequent adjustment periods are deduced by analogy. In this way, a coefficient of proportionality between timeslots occupied by the services at the two frequency bands is dynamically adjusted in the adjustment periods.

The foregoing coefficients of proportionality before and after adjustment are both in a range of (0,100%).

In this embodiment, by using statistical information of a service at a first frequency band and a service at a second frequency band in the $N^{th}$ adjustment period, service performance of the service at each frequency band in the adjustment period may be acquired; and based on the statistical information, and a QoS requirement that the services at the two frequency bands need to meet, a second coefficient of proportionality between timeslots occupied by the services at the two frequency bands in the $(N+1)^{th}$ adjustment period may be determined, so that switching control on a first channel and a second channel may be performed in the $(N+1)^{th}$ adjustment period according to the determined second coefficient of proportionality, further meeting quality requirements of the services at the two frequency bands to a greatest extent and improving quality of service.

Figure 2A:
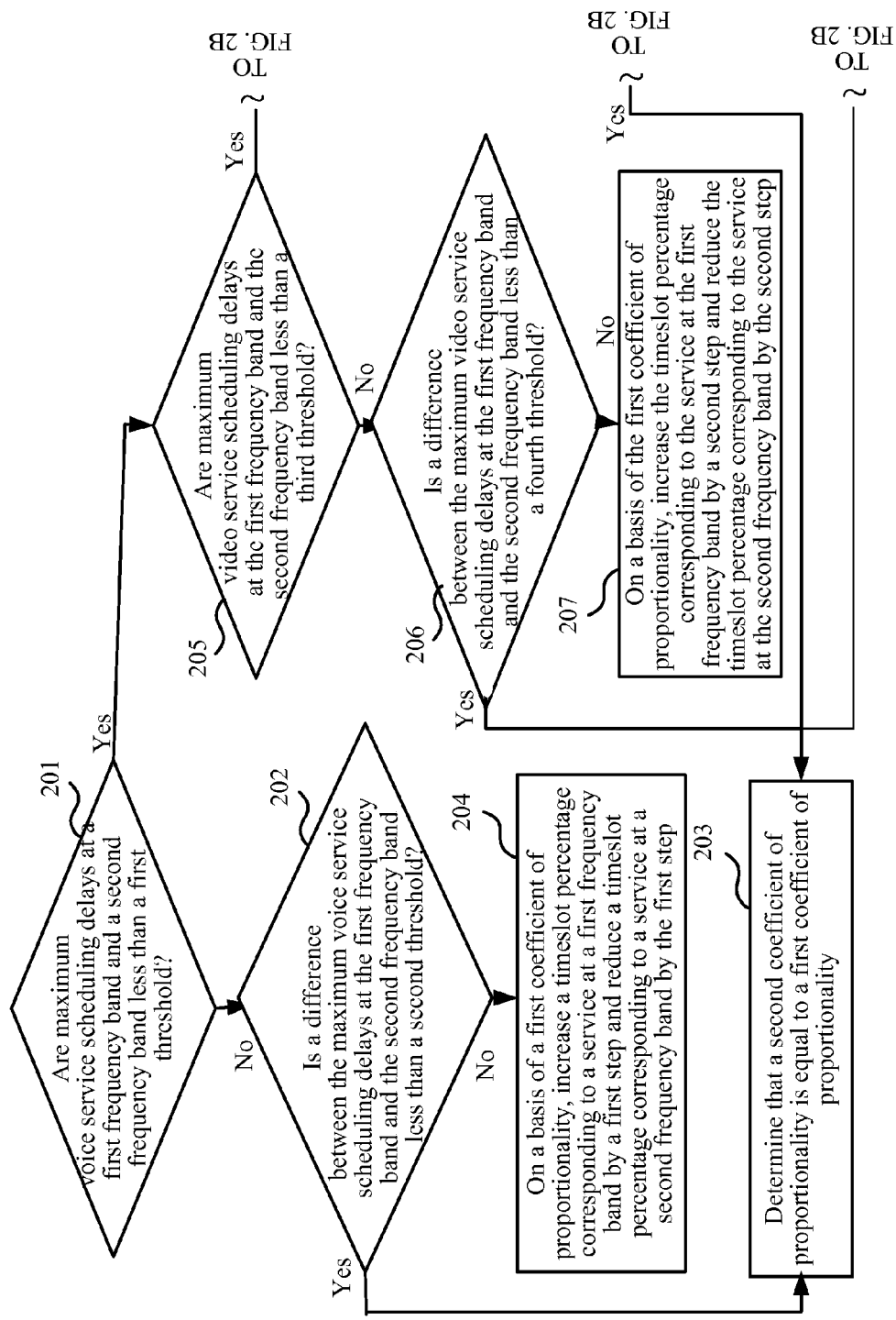
FIG. 2A and FIG. 2B are a flowchart of a dual band adaptive concurrent processing method according to Embodiment 2 of the present invention.
Figure 2B:
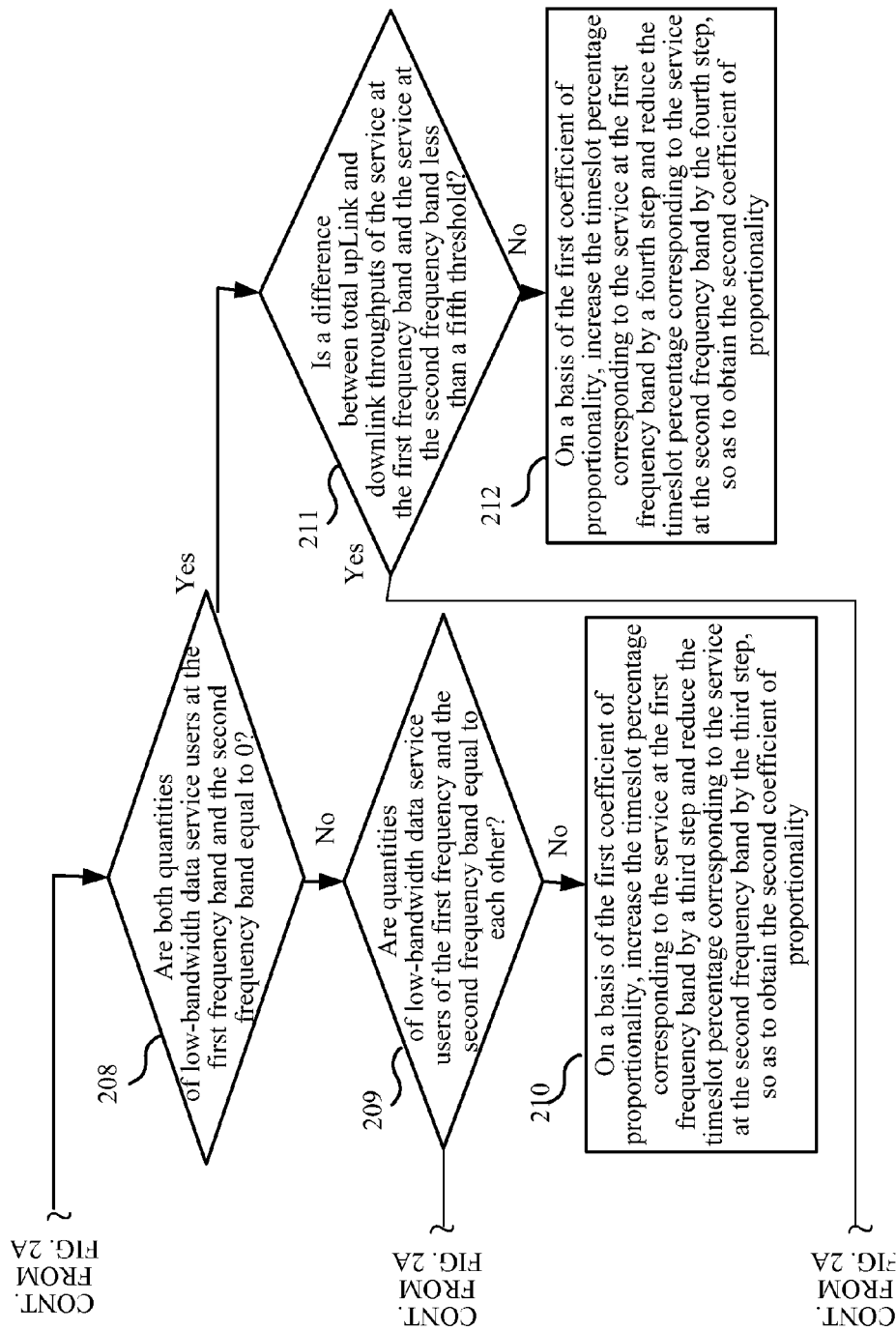

FIG. 2A and FIG. 2B are a flowchart of Embodiment 2 of a dual band adaptive concurrent processing method according to the present invention. As shown in FIG. 2A and FIG. 2B, an application scenario of DBAC is described in this embodiment. The application scenario may be an access point (AP for short)+AP mode, that is, two basic service sets (BSS for short) are separately created in an AP mode at 2.4 GHz and 5 GHz, so as to provide services for stations (STA for short) at the two frequency bands.

For the application scenario, if both a service at a first frequency band and a service at a second frequency band that are transmitted by the WLAN device include at least one service of: a voice service, a video service, and a data service, statistical information may include a maximum voice service scheduling delay, a maximum video service scheduling delay, a quantity of low-bandwidth data service users, and a total uplink and downlink throughput.

The maximum voice service scheduling delay is a maximum waiting time of voice queue packets at each frequency band from coming into a queue to being scheduled out of the queue in one adjustment period. For example, a maximum voice service scheduling delay at a 2.4 GHz frequency band is max_voice_delay_2G, and a maximum voice service scheduling delay at a 5 GHz frequency band is max_voice_delay_5G.

The maximum video service scheduling delay is a maximum waiting time of video queue packets at each frequency band from coming into a queue to being scheduled out of the queue. For example, a maximum video service scheduling delay at the 2.4 GHz frequency band is max_video_delay_2G, and a maximum video service scheduling delay at the 5 GHz frequency band is max_video_delay_5G.

The quantity of low-bandwidth data service users is a quantity of users for whom a sending service volume in a data queue at each frequency band does not meet a minimum bandwidth requirement in one adjustment period. For example, a quantity of low-bandwidth data service users at the 2.4 GHz frequency band is starve_data_num_2G, and a quantity of low-bandwidth data service users at the 5 GHz frequency band is starve_data_num_5G.

The total uplink and downlink throughput is a total throughput of uplink and downlink transmission of the services at the frequency bands in allocated timeslots in one adjustment period. The statistical information reflects a total service receiving and sending efficiency of a corresponding frequency band service. For example, a total uplink and downlink throughput of a 2.4 GHz frequency band service in a time of allocated timeslots is inuse_thrpt_2G, and a total uplink and downlink throughput of a 5 GHz frequency band service in a time of allocated timeslots is inuse_thrpt_5G.

Correspondingly, in this embodiment, a coefficient of proportionality between timeslots occupied by the service at the first frequency band and timeslots occupied by the service at the second frequency band in the $(N+1)^{th}$ adjustment period may be adjusted according to that: delay requirements of a voice service and a video service at the frequency bands are met preferentially, a minimum bandwidth requirement of services at the frequency bands is met next, and a maximized throughput requirement of the services at the frequency bands is met finally.

Based on the foregoing statistical information, a method for adjusting a timeslot percentage in this embodiment may include the following steps:

201. Determine whether maximum voice service scheduling delays at a first frequency band and a second frequency band are less than a first threshold; and if both the maximum voice service scheduling delays at the first frequency band and the second frequency band are less than a first threshold, perform 205; otherwise, perform 202, where the first threshold is a maximum scheduling delay required by voice service quality.

For example, it is first determined whether maximum scheduling delays of 2.4 GHz and 5 GHz voice services are less than a set threshold BAND_VOICE_DELAY_TH, where the threshold may be, for example, 20 ms.

If both the maximum scheduling delays of the voice services at the two frequency bands are less than the set threshold, it indicates that both the scheduling delays of the voice services at the two frequency bands meet a service requirement. In this case, 205 may be performed, so as to adjust a timeslot percentage according to a video service status.

If both the maximum scheduling delays of the voice services at the two frequency bands are greater than or equal to the set threshold, it indicates that a timeslot percentage in a previous adjustment period cannot meet a requirement of the voice service, and timeslot percentages of the services at the two frequency bands in a current adjustment period need to be adjusted according to a scheduling delay of the voice service.

202. Determine whether a difference between the maximum voice service scheduling delays of the service at the first frequency band and the service at the second frequency band is less than a preset second threshold; and if the difference is less than the preset second threshold, perform 203; otherwise, perform 204.

For example, if both the maximum voice service scheduling delays at 2.4 GHz and 5 GHz are greater than or equal to a threshold BAND_VOICE_DELAY_TH, it may be further determined whether a difference between the maximum voice service scheduling delays at the two frequency bands is less than a threshold BAND_VOICE_DELAY_DIFF, where the threshold may be, for example, 2 ms.

If the difference between the maximum voice service scheduling delays at 2.4 GHz and 5 GHz is less than the threshold BAND_VOICE_DELAY_DIFF, it indicates that, although both the services at the two frequency bands cannot meet a maximum scheduling delay requirement of the voice service, scheduling delays of the two are equivalent; then, timeslot percentages of the services at the two frequency bands are kept unchanged, that is, S203 is performed; otherwise, a timeslot percentage corresponding to a frequency band service having a larger maximum voice service scheduling delay may be increased by a step RATIO_ADJUT_STEP, where the step may be, for example, 5%, and correspondingly, a timeslot percentage of the other frequency band service is reduced by the corresponding step, that is, 204 is performed.

203. Determine that a second coefficient of proportionality is equal to a first coefficient of proportionality, where the first coefficient of proportionality indicates ratios of timeslots occupied by the service at the first frequency band and the service at the second frequency band in the $N^{th}$ adjustment period.

204. On a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band.

205. Determine whether maximum video service scheduling delays of the service at the first frequency band and the service at the second frequency band are less than a third threshold; and if the maximum video service scheduling delays are less than a third threshold, perform 208; otherwise, perform 206, where the third threshold is a maximum scheduling delay required by video service quality.

When both video service scheduling delays at the two frequency bands meet a service requirement, S208 may be performed.

For example, it is determined whether maximum video service scheduling delays at 2.4 GHz and 5 GHz are less than a set threshold BAND_VIDEO_DELAY_TH, where the threshold may be, for example, 40 ms.

If both the maximum video service scheduling delays at the two frequency bands are less than the set threshold, it indicates that both the video service scheduling delays at the two frequency bands meet a service requirement. In this case, S208 may be performed to adjust a timeslot percentage according to a data service status.

If both the maximum video service scheduling delays at the two frequency bands are greater than or equal to the set threshold, it indicates that a timeslot percentage in a previous adjustment period cannot meet a requirement of the video service, and timeslot percentages of the two frequency bands in a current adjustment period need to be adjusted according to a scheduling delay of the video service.

206. Determine whether a difference between the maximum video service scheduling delay of the service at the first frequency band and the maximum video service scheduling delay of the service at the second frequency band is less than a preset fourth threshold; and if the difference is less than a preset fourth threshold, perform 203; otherwise, perform 207.

For example, if both the maximum video service scheduling delays at 2.4 GHz and 5 GHz are greater than or equal to the threshold BAND_VIDEO_DELAY_TH, it may be further determined whether a difference between the maximum video service scheduling delays at the two frequency bands is less than a threshold BAND_VIDEO_DELAY_DIFF, where the threshold may be, for example, 4 ms.

If the difference between the maximum video service scheduling delays at 2.4 GHz and 5 GHz is less than the threshold BAND_VIDEO_DELAY_DIFF, it indicates that, although services at the two frequency bands cannot meet a maximum scheduling delay requirement of the video service, scheduling delays of the two are equivalent; then, timeslot percentages of services at the two frequency bands are kept unchanged, that is, S203 is performed; otherwise, a timeslot percentage corresponding to a frequency band service having a larger maximum video service scheduling delay may be increased by a step RATIO_ADJUT_STEP, where the step may be, for example, 5%, and correspondingly, a timeslot percentage of the other frequency band service is reduced by the corresponding step, that is, 207 is performed.

207. On a basis of the first coefficient of proportionality, increase the timeslot percentage corresponding to the service at the first frequency band by a second step and reduce the timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

208. Determine whether both quantities of low-bandwidth data service users of the service at the first frequency band and the service at the second frequency band are 0; and if the both quantities of low-bandwidth data service users are 0, perform 211; otherwise, perform 209.

If the requirements of both the voice service and the video service are met, a timeslot percentage may be further adjusted according to a processing status of a data service.

For example, it is determined whether quantities of users for whom a minimum bandwidth is not met at both 2.4 GHz and 5 GHz, that is, quantities of low-bandwidth data service users are 0; and if the quantities of low-bandwidth data service users are 0, it indicates that data services at the two frequency bands meet a bandwidth requirement, and the timeslot percentage is further adjusted by using the total uplink and downlink throughput, that is, 211 is performed; otherwise, it may be further determined whether quantities of users for whom the minimum bandwidth is not met are equal, that is, 209 is performed; and if they are equal, timeslot percentages of the two frequency bands keep unchanged, that is, 203 is performed; otherwise, a timeslot percentage corresponding to a frequency band with a larger quantity of users for whom the minimum bandwidth is not met is increased by a step RATIO_ADJUT_STEP, where the step may be, for example, 5%, and a timeslot percentage of the other frequency band is reduced by the corresponding step, that is, 210 is performed.

209. Determine whether the quantities of low-bandwidth data service users at the first frequency band and the second frequency band are equal; and if the quantities of low-bandwidth data service users are equal, perform 203; otherwise, perform 210.

210. On a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

211. Determine whether a difference between total uplink and downlink throughputs of the service at the first frequency band and the service at the second frequency band is less than a preset fifth threshold; and if the difference is less than a preset fifth threshold, perform 203; otherwise, perform 212.

If requirements of a voice service, a video service, and a data service are all met, a timeslot percentage may be further adjusted according to the total uplink and downlink throughput.

For example, a difference between total uplink and downlink throughputs of 2.4 GHz and 5 GHz is less than a threshold BAND_INUSE_THRPT_DIFF. If the difference between total uplink and downlink throughputs of 2.4 GHz and 5 GHz is less than the threshold BAND_INUSE_THRPT_DIFF, it indicates that the total uplink and downlink throughputs of the two frequency bands are relatively balanced, and the timeslot percentages of the two frequency bands may keep unchanged, that is, 203 is performed; otherwise, a timeslot percentage corresponding to a frequency band with a smaller total uplink and downlink throughput is increased by a step RATIO_ADJUT_STEP, where the step is, for example, 5%, and a timeslot percentage of the other frequency band is reduced by the corresponding step, that is, 212 is performed.

212. On a basis of the first coefficient of proportionality, increase the timeslot percentage corresponding to the service at the first frequency band by a fourth step and reduce the timeslot percentage corresponding to the service at the second frequency band by the fourth step, so as to obtain the second coefficient of proportionality, where the total uplink and downlink throughput of the service at the first frequency band is greater than the total uplink and downlink throughput of the service at the second frequency band.

It should be noted that, because a value of a timeslot percentage of each frequency band is in a valid range [MIN_SLOT_RATIO,MAX_SLOT_RATIO], where the interval may be, for example, [20%,80%], in the foregoing process, adjustment of a timeslot percentage may be limited to being in this interval.

In FIG. 2A and FIG. 2B, there is no strict time sequence among the determining steps, and the process is merely an instance and not intended to limit the present invention. For example, a sequence among steps 201, 205, 208, and 211 may be adjusted or may be performed concurrently.

Meanings and related descriptions of parameters related to the foregoing process are listed in Table 1.

TABLE 1

| Parameter | Meaning | Typical value | Description |
|---|---|---|---|
| BAND_VOICE_DELAY_TH | Voice scheduling delay threshold of a frequency band | 20 ms | If a voice scheduling delay of a frequency band exceeds this threshold, it indicates that more timeslots need to be allocated to the frequency band to meet a voice delay requirement. |
| BAND_VOICE_DELAY_DIFF | Voice scheduling delay difference threshold of a frequency band | 2 ms | If a difference between voice scheduling delays at 2.4G and 5G frequency bands is less than this threshold, it indicates that the difference between the two may be ignored. |
| BAND_VIDEO_DELAY_TH | Video scheduling delay threshold of a frequency band | 40 ms | If a video scheduling delay of a frequency band exceeds this threshold, it indicates that more timeslots need to be allocated to the frequency band to ensure a video delay requirement. |
| BAND_VIDEO_DELAY_DIFF | Video scheduling delay difference threshold of a frequency band | 4 ms | If a difference between video scheduling delays at 2.4G and 5G frequency bands is less than this threshold, it indicates that the difference between the two may be ignored. |
| BAND_INUSE_THRPT_DIFF | In-use throughput difference threshold of a frequency band | 1 Mbps | If a difference between in-use throughputs of 2.4G and 5G frequency bands is less than this threshold, it indicates that the difference between the two can be ignored. |
| MAX_SLOT_RATIO | Maximum timeslot percentage | 80% | Maximum timeslot percentage of a frequency band |
| MIN_SLOT_RATIO | Minimum timeslot percentage | 20% | Minimum timeslot percentage of a frequency band |
| RATIO_ADJUT_STEP | Timeslot percentage adjustment step | 5% | Step for adjusting a timeslot percentage |

For an AP+AP dual band switching device, the method in this embodiment may preferentially meet a delay requirement of a voice service at each frequency band as far as possible, further, try to meet a delay requirement of a video service, and finally, try to meet a minimum bandwidth requirement of a data service. On this basis, a total throughput of each frequency band can be maximized.

It may be learned from the foregoing embodiment that, in specific implementation, the following implementation manners may further exist:

Manner 1: If both the service at the first frequency band and the service at the second frequency band that are transmitted by the WLAN device are voice services, the statistical information includes a maximum voice service scheduling delay; and correspondingly, 102 is as follows:

determining whether both a maximum voice service scheduling delay of the service at the first frequency band and a maximum voice service scheduling delay of the service at the second frequency band are less than a first threshold, where the first threshold is a maximum scheduling delay required by voice service quality; and if both the maximum voice service scheduling delay of the service at the first frequency band and the maximum voice service scheduling delay of the service at the second frequency band are less than the first threshold, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether a difference between the maximum voice service scheduling delay of the service at the first frequency band and the maximum voice service scheduling delay of the service at the second frequency band is less than a preset second threshold; if the difference is less than the second threshold, determining that the second coefficient of proportionality is equal to the first coefficient of proportionality; and if the difference is greater than or equal to the second threshold, on a basis of the first coefficient of proportionality, increasing a timeslot percentage corresponding to the service at the first frequency band by a first step and reducing a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band.

Manner 2: If both the service at the first frequency band and the service at the second frequency band that are transmitted by the WLAN device are video services, the statistical information includes a maximum video service scheduling delay; and correspondingly, 102 is as follows:

determining whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether a difference between the maximum video service scheduling delay of the service at the first frequency band and the maximum video service scheduling delay of the service at the second frequency band is less than a preset fourth threshold; if the difference is less than the fourth threshold, determining that the second coefficient of proportionality is equal to the first coefficient of proportionality; and if the difference is greater than or equal to the fourth threshold, on a basis of the first coefficient of proportionality, increasing a timeslot percentage corresponding to the service at the first frequency band by a second step and reducing a timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

Manner 3: If both the service at the first frequency band and the service at the second frequency band that are transmitted by the WLAN device are data services, the statistical information includes a quantity of low-bandwidth data service users; and correspondingly, 102 is as follows:

determining whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, determining that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determining whether the quantity of low-bandwidth data service users of the service at the first frequency band is equal to the quantity of low-bandwidth data service users of the service at the second frequency band;

if the quantity of low-bandwidth data service users of the service at the first frequency band is equal to the quantity of low-bandwidth data service users of the service at the second frequency band, determining that the second coefficient of proportionality is equal to the first coefficient of proportionality; and if the quantity of low-bandwidth data service users of the service at the first frequency band is not equal to the quantity of low-bandwidth data service users of the service at the second frequency band, on a basis of the first coefficient of proportionality, increasing a timeslot percentage corresponding to the service at the first frequency band by a third step and reducing a timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

Figure 3:
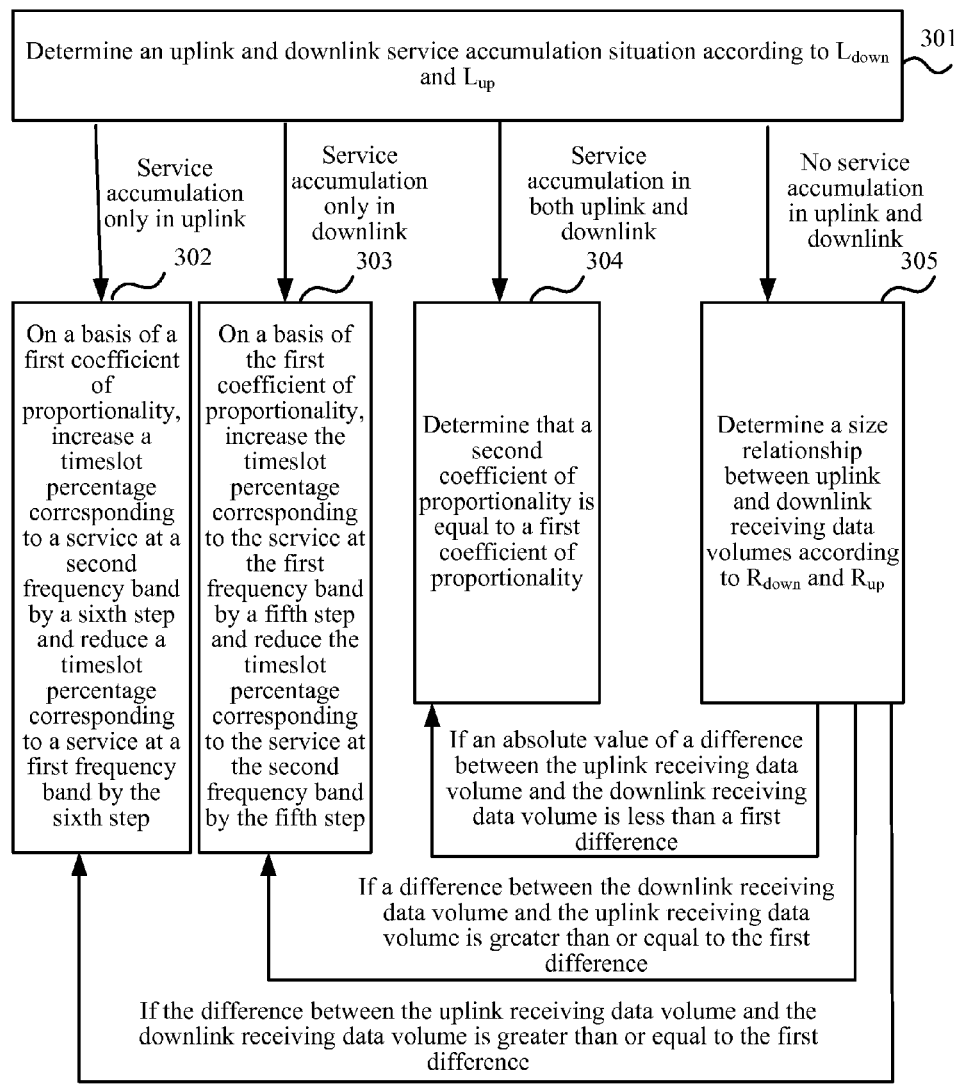
FIG. 3 is a flowchart of a dual band adaptive concurrent processing method according to Embodiment 3 of the present invention.
Figure 4:
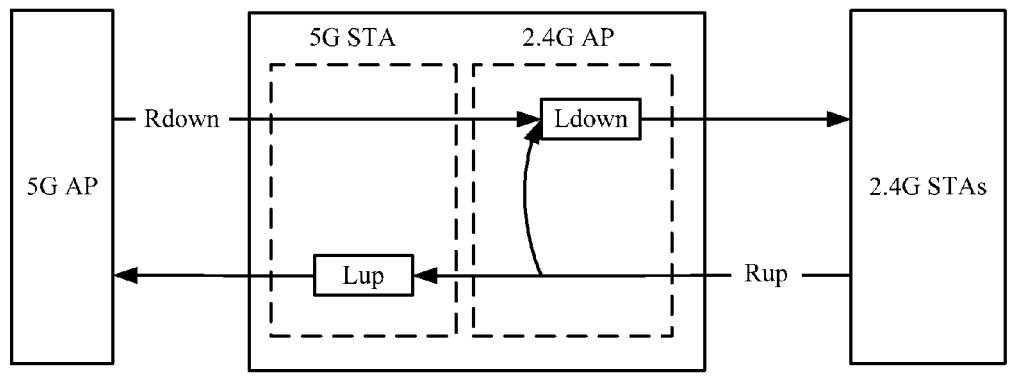
FIG. 4 is a schematic diagram of a working mode of a repeater applied in an embodiment shown in FIG. 3.

FIG. 3 is a flowchart of Embodiment 3 of a dual band adaptive concurrent processing method according to the present invention. FIG. 4 is a schematic diagram of a repeater working mode applied in an embodiment shown in FIG. 3. As shown in FIG. 3 and FIG. 4, another application scenario of DBAC is described in this embodiment, and the application scenario may be a STA+AP repeater mode.

For the STA+AP repeater mode, a working manner of a WLAN device may be a working mode shown in FIG. 4: 5 GHz band works in a STA mode (served node) and communicates with a 5G AP, and 2.4 GHz band works in an AP mode (serving node) and communicates with a 2.4G STA. Service data may be forwarded to 2.4 GHz by using 5 GHz, or forwarded to 5 GHz by using 2.4 GHz, or forwarded within a BSS of 2.4 GHz (sent to 2.4 GHz from 2.4 GHz).

For the application scenario, an objective for optimization is to maximize a forwarding service volume of the Repeater.

Referring to FIG. 4, in specific implementation, for such data forwarding services, statistical information may include:

$R_{down}$: a downlink data volume received by the Repeater from an AP;

$L_{down}$: a data volume temporarily stored in a downlink sending queue of the Repeater;

$R_{up}$: an uplink data volume received by the Repeater from a STA; and $L_{up}$: a data volume temporarily stored in an uplink sending queue of the Repeater.

Based on the foregoing statistical information, a specific procedure in which the Repeater adjusts a timeslot percentage is shown in FIG. 3.

301. Determine an uplink and downlink service accumulation situation according to $L_{down}$ and $L_{up}$; if there is service accumulation only in uplink, perform 302; if there is service accumulation only in downlink, perform 303; if there is service accumulation in both uplink and downlink, perform 304; and if there is no accumulation in uplink and downlink, perform 305.

If MAX $\{L_{up}, L_{down}\} < P_{TH}$, it is determined that there is no service accumulation in uplink and downlink;

Otherwise, if $$\frac{L_{up} - L_{down}}{L_{up} + L_{down}} \in [-1, -A_{TH}],$$

there is accumulation only in downlink;

if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink; where $B_{TH}$ and $A_{TH}$ are values in a value range of (0,1).

302. On a basis of a first coefficient of proportionality, increase a timeslot percentage corresponding to the service at the second frequency band by a sixth step and reduce a timeslot percentage corresponding to the service at the first frequency band by the sixth step, so as to obtain the second coefficient of proportionality.

303. On a basis of the first coefficient of proportionality, increase the timeslot percentage corresponding to the service at the first frequency band by a fifth step and reduce the timeslot percentage corresponding to the service at the second frequency band by the fifth step, so as to obtain the second coefficient of proportionality, where the first coefficient of proportionality indicates ratios of timeslots occupied by the service at the first frequency band and the service at the second frequency band in the $N^{th}$ adjustment period.

304. Determine that the second coefficient of proportionality is equal to the first coefficient of proportionality.

For example, if there is service accumulation only in downlink, a timeslot percentage of a 2.4 GHz service is increased by p %, and correspondingly, a timeslot percentage of a 5 GHz service is reduced by p %;

if there is service accumulation only in uplink, the timeslot percentage of the 5 GHz service is increased by p %, and correspondingly, the timeslot percentage of the 2.4 GHz service is reduced by p %;

if there is service accumulation in both uplink and downlink, the timeslot percentages remain unchanged; and if there is no service accumulation in uplink and downlink, S305 is performed.

305. Comparing uplink and downlink receiving data volumes according to $R_{down}$ and $R_{up}$; if a value of the downlink receiving data volume minus the uplink receiving data volume is greater than or equal to a preset first difference, perform 303; if a value of the uplink receiving data volume minus the downlink receiving data volume is greater than or equal to the preset first difference, perform 302; and if an absolute value of the difference between the uplink receiving data volume and the downlink receiving data volume is less than the first difference, perform 304.

If $$\frac{R_{up} - R_{down}}{R_{up} + R_{down}} \in [-1, -B_{TH}],$$

it may be determined that the difference between the downlink receiving data volume and the uplink receiving data volume is greater than or equal to the first difference;

if $$\frac{R_{up} - R_{down}}{R_{up} + R_{down}} \in [B_{TH}, 1],$$

it may be determined that the difference between the uplink receiving data volume and the downlink receiving data volume is greater than or equal to the first difference; and if $$\frac{R_{up} - R_{down}}{R_{up} + R_{down}} \in (-B_{TH}, B_{TH}),$$

it may be determined that the absolute value of the difference between the uplink receiving data volume and the downlink receiving data volume is less than the first difference; where $B_{TH}$ is a preset value in a value range of (0,1).

For a STA+AP dual band switching mode, the method in this embodiment may maximize a forwarding service volume of a repeater device.

In the foregoing several specific implementation manners, the first coefficient of proportionality between timeslots occupied by services at two frequency bands in the $N^{th}$ adjustment period is used as a basis to perform adjustment according to a preset step, so as to obtain the second coefficient of proportionality between the timeslots occupied by the services at the two frequency bands in the $(N+1)^{th}$ adjustment period. In another implementation manner, the second coefficient of proportionality between the timeslots occupied by the service at the first frequency band and the service at the second frequency band in the $(N+1)^{th}$ adjustment period may be directly calculated according to statistical information obtained in the $N^{th}$ adjustment period, and a QoS requirement that needs to be met by the services at the two frequency bands, instead of based on the first coefficient of proportionality between the timeslots occupied by the services at the two frequency bands in the $N^{th}$ adjustment period.

It is assumed that services at two frequency bands are the same, for example, the services are voice services. A voice service scheduling delay at a first frequency band and a voice service scheduling delay at a second frequency band may be obtained, and then a coefficient of proportionality between timeslots occupied by the voice services at the two frequency bands in the $(N+1)^{th}$ period may be calculated according to differences between the delays and a maximum scheduling delay required by QoS.

It may be understood that, there is no strict time sequence among steps in FIG. 3, and the schematic diagram merely shows a conversion relationship between logical states in this embodiment of the present invention.

It is assumed that services at two frequency bands are different, for example, the service at the first frequency band is a voice service and the service at the second frequency band is a video service. A first scheduling delay of the voice service at the first frequency band and a second scheduling delay of the video service at the second frequency band may be obtained. Because the voice service has a higher requirement for a scheduling delay than the video service, an initial coefficient of proportionality between timeslots occupied by the voice service and the video service may be calculated according to a difference between the first scheduling delay and a maximum scheduling delay required by QoS, and a difference between the second scheduling delay and the maximum scheduling delay required by the QoS. In addition, on a basis of the initial coefficient of proportionality, a ratio of timeslots occupied by the voice service is increased by a preset value, and correspondingly, a ratio of timeslots occupied by the video service is reduced by the corresponding preset value.

Figure 5:
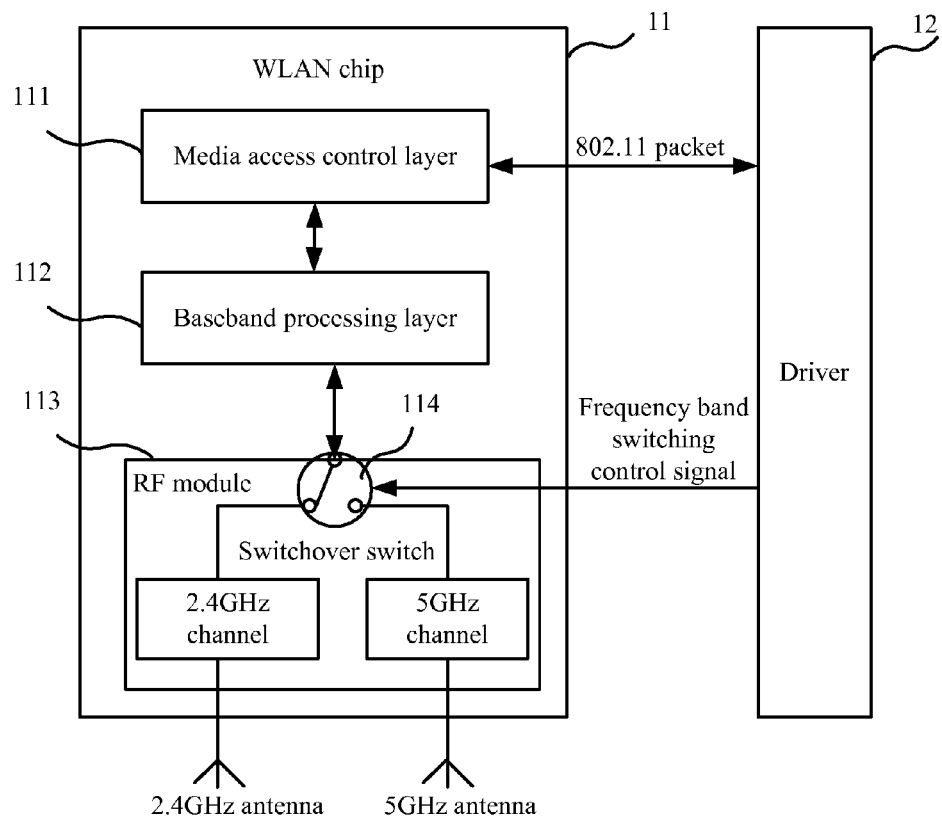
FIG. 5 is a schematic structural diagram of a WLAN device according to an embodiment of the present invention.

FIG. 5 is a schematic structural diagram of an embodiment of a WLAN device according to the present invention. The WLAN device in this embodiment may include a WLAN chip 11 and a driver 12. The WLAN chip 11 may include a media access controller 111, a baseband processor 112, and a radio frequency (RF for short) module 113. The RF module 113 may include channels of two frequency bands, for example, a 2.4 GHz channel and a 5 GHz channel, where the 2.4 GHz channel implements communication by using a 2.4 GHz antenna and the 5 GHz channel implements communication by using a 5 GHz antenna. The 2.4 GHz channel and the 5 GHz channel share the media access controller 111 and the baseband processor 112, and the channels of the two frequency bands connect to the baseband processor 112 by using a switchover switch 114.

The driver 12 is configured to perform the following steps:

Separately acquire statistical information of a service at a first frequency band and a service at a second frequency band in the $N^{th}$ adjustment period, where the statistical information indicates service performance of the services at the frequency bands in the adjustment period, and N is a natural number. For example, the driver 12 may exchange an 802.11 packet with the media access controller 111. Based on an exchange status of the 802.11 packet, for example, whether a packet is successfully sent and a packet sending frequency, the driver 12 may acquire statistical information of the service at the first frequency band and the service at the second frequency band. A person skilled in the art may understand that this is also applicable to a packet of another protocol.

Determine, according to the statistical information, and a quality of service (QoS) requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period.

Perform switching control on the first channel and the second channel in the $(N+1)^{th}$ adjustment period according to the determined second coefficient of proportionality, so that a ratio between communicating timeslots of the first channel and timeslots of the second channel in the $(N+)^{th}$ adjustment period is equal to the second coefficient of proportionality. The switching control is implemented by using a frequency band switching control signal in FIG. 5. The driver 12 controls the switchover switch 114 by using the frequency band switching control signal, so that the ratio between communicating timeslots of the first channel and timeslots of the second channel in the $(N+1)^{th}$ adjustment period is equal to the second coefficient of proportionality.

Further, if both the service at the first frequency band and the service at the second frequency band that are transmitted by the WLAN device are voice services, the statistical information includes a maximum voice service scheduling delay; and the driver 12 is configured to:

determine whether both a maximum voice service scheduling delay of the service at the first frequency band and a maximum voice service scheduling delay of the service at the second frequency band are less than a first threshold, where the first threshold is a maximum scheduling delay required by voice service quality; and if both the maximum voice service scheduling delay of the service at the first frequency band and the maximum voice service scheduling delay of the service at the second frequency band are less than the first threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether a difference between the maximum voice service scheduling delay of the service at the first frequency band and the maximum voice service scheduling delay of the service at the second frequency band is less than a preset second threshold; if the difference is less than the second threshold, determine that the second coefficient of proportionality is equal to the first coefficient of proportionality; and if the difference is greater than or equal to the second threshold, on a basis of the first coefficient of proportionality, increase a timeslot percentage corresponding to the service at the first frequency band by a step and reduce a timeslot percentage corresponding to the service at the second frequency band by a corresponding step, so as to obtain the second coefficient of proportionality, where the maximum voice service scheduling delay of the service at the first frequency band is greater than the maximum voice service scheduling delay of the service at the second frequency band.

If both the service at the first frequency band and the service at the second frequency band that are transmitted by the WLAN device are video services, the statistical information includes a maximum video service scheduling delay; and the driver 12 is configured to:

determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between timeslots occupied by the service at the first frequency band and the service at the second frequency band in the $N^{th}$ adjustment period;

otherwise, determine whether a difference between the maximum video service scheduling delay of the service at the first frequency band and a video service delay value of the service at the second frequency band is less than a preset fourth threshold; if the difference is less than the fourth threshold, determine that the second coefficient of proportionality is equal to the first coefficient of proportionality; and if the difference is greater than or equal to the fourth threshold, on a basis of the first coefficient of proportionality, increase a timeslot percentage corresponding to the service at the first frequency band by a second step and reduce a timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

If both the service at the first frequency band and the service at the second frequency band that are transmitted by the WLAN device are data services, the statistical information includes a quantity of low-bandwidth data service users; and the driver 12 is configured to:

determine whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether the quantity of low-bandwidth data service users of the service at the first frequency band is equal to the quantity of low-bandwidth data service users of the service at the second frequency band;

if the quantity of low-bandwidth data service users of the service at the first frequency band is equal to the quantity of low-bandwidth data service users of the service at the second frequency band, determine that the second coefficient of proportionality is equal to the first coefficient of proportionality; and if the quantity of low-bandwidth data service users of the service at the first frequency band is not equal to the quantity of low-bandwidth data service users of the service at the second frequency band, on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

If both the service at the first frequency band and the service at the second frequency band that are transmitted by the WLAN device include at least one service of: a voice service, a video service, and a data service, the statistical information includes a maximum voice service scheduling delay, a maximum video service scheduling delay, a quantity of low-bandwidth data service users, and a total uplink and downlink throughput;

and the driver 12 is configured to:

201. determine whether maximum voice service scheduling delays of the service at the first frequency band and the service at the second frequency band are less than a first threshold, where the first threshold is a maximum scheduling delay required by voice service quality; and if both the maximum voice service scheduling delays of the service at the first frequency band and the service at the second frequency band are less than the first threshold, perform 205; otherwise, perform 202;

202. determine whether a difference between the maximum voice service scheduling delays of the service at the first frequency band and the service at the second frequency band is less than a preset second threshold; and if the difference is less than the second threshold, perform 203; otherwise, perform 204;

203. determine that the second coefficient of proportionality is equal to a first coefficient of proportionality, where the first coefficient of proportionality indicates ratios of timeslots occupied by the service at the first frequency band and the service at the second frequency band in the $N^{th}$ adjustment period;

204. on a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band;

205. determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, perform S208; otherwise, perform 206;

206. determine whether a difference between the maximum video service scheduling delay of the service at the first frequency band and the maximum video service scheduling delay of the service at the second frequency band is less than a preset fourth threshold; and if the difference is less than the fourth threshold, perform 203; otherwise, perform 207;

207. on a basis of the first coefficient of proportionality, increase the timeslot percentage corresponding to the service at the first frequency band by a second step and reduce the timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band;

208. determine whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, perform 211; otherwise, perform 209;

209. determine whether the quantity of low-bandwidth data service users of the service at the first frequency band is equal to the quantity of low-bandwidth data service users of the service at the second frequency band; and if the quantity of low-bandwidth data service users of the service at the first frequency band is equal to the quantity of low-bandwidth data service users of the service at the second frequency band, perform S203; otherwise, perform 210;

210. on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band;

211. determine whether a difference between total uplink and downlink throughputs of the service at the first frequency band and the service at the second frequency band is less than a preset fifth threshold; and if the difference is less than the fifth threshold, perform 203; otherwise, perform 212; and 212. on a basis of the first coefficient of proportionality, increase the timeslot percentage corresponding to the service at the first frequency band by a fourth step and reduce the timeslot percentage corresponding to the service at the second frequency band by the fourth step, so as to obtain the second coefficient of proportionality, where the total uplink and downlink throughput of the service at the first frequency band is greater than the total uplink and downlink throughput of the service at the second frequency band.

If both the service at the first frequency band and the service at the second frequency band that are transmitted by the WLAN device are data services, the statistical information includes:

a downlink data volume $R_{down}$ received from an access point (AP) at the first frequency band, and a data volume $L_{down}$ temporarily stored in a downlink sending queue; and an uplink data volume $R_{up}$ received from a STA at the second frequency band, and a data volume $L_{up}$ temporarily stored in an uplink sending queue; and the driver 12 is configured to:

determine an uplink and downlink service accumulation situation according to $L_{down}$ and $L_{up}$, where if MAX $\{L_{up}, L_{down}\} < P_{TH}$, it is determined that there is no service accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, where $P_{TH}$ is a preset threshold, and $A_{TH}$ is a preset value in a value range of (0,1);

if there is service accumulation only in downlink, on a basis of the first coefficient of proportionality, increase a timeslot percentage corresponding to the service at the first frequency band by a fifth step and reduce a timeslot percentage corresponding to the service at the second frequency band by the fifth step, so as to obtain the second coefficient of proportionality, where the first coefficient of proportionality indicates ratios of timeslots occupied by the service at the first frequency band and the service at the second frequency band in the $N^{th}$ adjustment period;

if there is service accumulation only in uplink, on a basis of the first coefficient of proportionality, increase the timeslot percentage corresponding to the service at the second frequency band by a sixth step and reduce the timeslot percentage corresponding to the service at the first frequency band by the sixth step, so as to obtain the second coefficient of proportionality;

if there is service accumulation in both uplink and downlink, determine that the second coefficient of proportionality is equal to the first coefficient of proportionality;

if there is no service accumulation in uplink and downlink, compare between uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increase the timeslot percentage corresponding to the service at the first frequency band by a fifth step and reduce the timeslot percentage corresponding to the service at the second frequency band by the fifth step, so as to obtain the second coefficient of proportionality;

if a value of the uplink receiving data volume minus the downlink receiving data volume is greater than or equal to the first difference, on a basis of the first coefficient of proportionality, increase the timeslot percentage corresponding to the service at the second frequency band by a sixth step and reduce the timeslot percentage corresponding to the service at the first frequency band by the sixth step, so as to obtain the second coefficient of proportionality; and if an absolute value of the difference between the uplink receiving data volume and the downlink receiving data volume is less than the first difference, determine that the second coefficient of proportionality is equal to the first coefficient of proportionality.

Further, the driver 12 is configured to:
if $$\frac{R_{up} - R_{down}}{R_{up} + R_{down}} \in [-1, -B_{TH}],$$

determine that the difference between the downlink receiving data volume and the uplink receiving data volume is greater than or equal to the first difference;
if $$\frac{R_{up} - R_{down}}{R_{up} + R_{down}} \in [B_{TH}, 1],$$

determine that the difference between the uplink receiving data volume and the downlink receiving data volume is greater than or equal to the first difference; and
if $$\frac{R_{up} - R_{down}}{R_{up} + R_{down}} \in (-B_{TH}, B_{TH}),$$

determine that the absolute value of the difference between the uplink receiving data volume and the downlink receiving data volume is less than the first difference; where $B_{TH}$ is a preset value in a value range of (0,1).

In addition, the driver 12 is configured to:
calculate, according to the statistical information, and a QoS requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period.

When the driver 12 is configured to perform the foregoing procedure of steps, each step may be seen as a module in the driver 12, where the module is configured to implement a function of a related step.

The WLAN device according to this embodiment may be configured to implement the technical solutions of the method embodiment shown in FIG. 1. The implementation principle and technical effects are similar to those in the method embodiment, and details are not described herein again.

Figure 6:
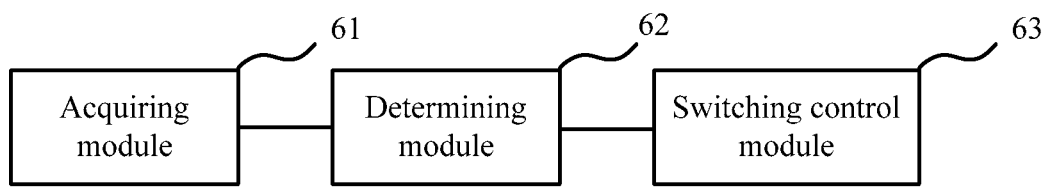
FIG. 6 is a schematic structural diagram of a dual band adaptive concurrent processing apparatus according to an embodiment of the present invention.

FIG. 6 is a schematic structural diagram of an embodiment of a dual band adaptive concurrent processing apparatus according to the present invention. As shown in FIG. 6, the apparatus in this embodiment is applied to a wireless local area network WLAN device, for example, the WLAN device shown in FIG. 5. The apparatus includes:

an acquiring module 61, configured to separately acquire statistical information of a service at a first frequency band and a service at a second frequency band in the $N^{th}$ adjustment period, where the statistical information indicates service performance of the services at the frequency bands in the adjustment period, and N is a natural number;

a determining module 62, configured to determine, according to the statistical information, and a quality of service (QoS) requirement that the service at the first frequency band and the service at the second frequency band need to meet, a second coefficient of proportionality between timeslots occupied by the service at the first frequency band and timeslots occupied by the service at the second frequency band in the $(N+1)^{th}$ adjustment period; and a switching control module 63, configured to perform switching control on the first channel and the second channel in the $(N+1)^{th}$ adjustment period according to the determined second coefficient of proportionality, so that a ratio between communicating timeslots of the first channel and timeslots of the second channel in the $(N+1)^{th}$ adjustment period is equal to the second coefficient of proportionality.

Optionally, if both the service at the first frequency band and the service at the second frequency band that are transmitted by the WLAN device are voice services, the statistical information includes a maximum voice service scheduling delay; and
the determining module 62 is configured to:

determine whether both a maximum voice service scheduling delay of the service at the first frequency band and a maximum voice service scheduling delay of the service at the second frequency band are less than a first threshold, where the first threshold is a maximum scheduling delay required by voice service quality; and if both the maximum voice service scheduling delay of the service at the first frequency band and the maximum voice service scheduling delay of the service at the second frequency band are less than the first threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether a difference between the maximum voice service scheduling delay of the service at the first frequency band and the maximum voice service scheduling delay of the service at the second frequency band is less than a preset second threshold; if the difference is less than the second threshold, determine that the second coefficient of proportionality is equal to the first coefficient of proportionality; and if the difference is greater than or equal to the second threshold, on a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band.

Optionally, if both the service at the first frequency band and the service at the second frequency band that are transmitted by the WLAN device are video services, the statistical information includes a maximum video service scheduling delay; and the determining module 62 is configured to:

determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether a difference between the maximum video service scheduling delay of the service at the first frequency band and the maximum video service scheduling delay of the service at the second frequency band is less than a preset fourth threshold; if the difference is less than the fourth threshold, determine that the second coefficient of proportionality is equal to the first coefficient of proportionality; and if the difference is greater than or equal to the fourth threshold, on a basis of the first coefficient of proportionality, increase a timeslot percentage corresponding to the service at the first frequency band by a second step and reduce a timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band.

Optionally, if both the service at the first frequency band and the service at the second frequency band that are transmitted by the WLAN device are data services, the statistical information includes a quantity of low-bandwidth data service users; and the determining module 62 is configured to:

determine whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, determine that the second coefficient of proportionality between the timeslots occupied by the service at the first frequency band and the service at the second frequency band in the $(N+1)^{th}$ adjustment period is equal to a first coefficient of proportionality, where the first coefficient of proportionality indicates a ratio between the timeslots occupied by the service at the first frequency band and the service at the second frequency band in the $N^{th}$ adjustment period;

otherwise, determine whether the quantity of low-bandwidth data service users of the service at the first frequency band is equal to the quantity of low-bandwidth data service users of the service at the second frequency band;

if the quantity of low-bandwidth data service users of the service at the first frequency band is equal to the quantity of low-bandwidth data service users of the service at the second frequency band, determine that the second coefficient of proportionality is equal to the first coefficient of proportionality; and if the quantity of low-bandwidth data service users of the service at the first frequency band is not equal to the quantity of low-bandwidth data service users of the service at the second frequency band, on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band.

Optionally, if both the service at the first frequency band and the service at the second frequency band that are transmitted by the WLAN device include at least one service of: a voice service, a video service, and a data service, the statistical information includes a maximum voice service scheduling delay, a maximum video service scheduling delay, a quantity of low-bandwidth data service users, and a total uplink and downlink throughput; and the determining module 62 is configured to:

201. determine whether maximum voice service scheduling delays of the service at the first frequency band and the service at the second frequency band are less than a first threshold, where the first threshold is a maximum scheduling delay required by voice service quality; and if both the maximum voice service scheduling delays of the service at the first frequency band and the service at the second frequency band are less than the first threshold, perform 205; otherwise, perform 202;

202. determine whether a difference between the maximum voice service scheduling delays of the service at the first frequency band and the service at the second frequency band is less than a preset second threshold; and if the difference is less than the second threshold, perform 203; otherwise, perform 204;

203. determine that the second coefficient of proportionality is equal to a first coefficient of proportionality, where the first coefficient of proportionality indicates ratios of timeslots occupied by the service at the first frequency band and the service at the second frequency band in the $N^{th}$ adjustment period;

204. on a basis of the first coefficient of proportionality, increase a timeslot percentage corresponding to the service at the first frequency band by a first step and reduce a timeslot percentage corresponding to the service at the second frequency band by the first step, so as to obtain the second coefficient of proportionality, where the maximum voice service scheduling delay of the service at the first frequency band is greater than the maximum voice service scheduling delay of the service at the second frequency band;

205. determine whether both a maximum video service scheduling delay of the service at the first frequency band and a maximum video service scheduling delay of the service at the second frequency band are less than a third threshold, where the third threshold is a maximum scheduling delay required by video service quality; and if both the maximum video service scheduling delay of the service at the first frequency band and the maximum video service scheduling delay of the service at the second frequency band are less than the third threshold, perform 208; otherwise, perform 206;

206. determine whether a difference between the maximum video service scheduling delay of the service at the first frequency band and the maximum video service scheduling delay of the service at the second frequency band is less than a preset fourth threshold; and if the difference is less than the fourth threshold, perform 203; otherwise, perform 207;

207. on a basis of the first coefficient of proportionality, increase the timeslot percentage corresponding to the service at the first frequency band by a second step and reduce the timeslot percentage corresponding to the service at the second frequency band by the second step, so as to obtain the second coefficient of proportionality, where the maximum video service scheduling delay of the service at the first frequency band is greater than the maximum video service scheduling delay of the service at the second frequency band;

208. determine whether both a quantity of low-bandwidth data service users of the service at the first frequency band and a quantity of low-bandwidth data service users of the service at the second frequency band are 0; and if both the quantity of low-bandwidth data service users of the service at the first frequency band and the quantity of low-bandwidth data service users of the service at the second frequency band are 0, perform 211; otherwise, perform 209;

209. determine whether the quantity of low-bandwidth data service users of the service at the first frequency band is equal to the quantity of low-bandwidth data service users of the service at the second frequency band; and if the quantity of low-bandwidth data service users of the service at the first frequency band is equal to the quantity of low-bandwidth data service users of the service at the second frequency band, perform 203; otherwise, perform 210;

210. on a basis of the first coefficient of proportionality, increase the timeslot percentage corresponding to the service at the first frequency band by a third step and reduce the timeslot percentage corresponding to the service at the second frequency band by the third step, so as to obtain the second coefficient of proportionality, where the quantity of low-bandwidth data service users of the service at the first frequency band is greater than the quantity of low-bandwidth data service users of the service at the second frequency band;

211. determine whether a difference between total uplink and downlink throughputs of the service at the first frequency band and the service at the second frequency band is less than a preset fifth threshold; and if the difference is less than the fifth threshold, perform 203; otherwise, perform 212; and

212. on a basis of the first coefficient of proportionality, increase the timeslot percentage corresponding to the service at the first frequency band by a fourth step and reduce the timeslot percentage corresponding to the service at the second frequency band by the fourth step, so as to obtain the second coefficient of proportionality, where the total uplink and downlink throughput of the service at the first frequency band is greater than the total uplink and downlink throughput of the service at the second frequency band.

Optionally, if the service at the first frequency band and the service at the second frequency band that are transmitted by the WLAN device are data forwarding services, the statistical information includes a downlink data volume $R_{down}$ received from an access point (AP) at the first frequency band, a data volume $L_{down}$ temporarily stored in a downlink sending queue, an uplink data volume $R_{up}$ received from a STA at the second frequency band, and a data volume $L_{up}$ temporarily stored in an uplink sending queue; and the determining module 62 is configured to:

determine an uplink and downlink service accumulation situation according to $L_{down}$ and $L_{up}$, where if MAX $\{L_{up}, L_{down}\} < P_{TH}$, it is determined that there is no service accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, where $P_{TH}$ is a preset threshold, and $A_{TH}$ is a preset value in a value range of (0,1);

if there is service accumulation only in downlink, on a basis of the first coefficient of proportionality, increase a timeslot percentage corresponding to the service at the first frequency band by a fifth step and reduce a timeslot percentage corresponding to the service at the second frequency band by the fifth step, so as to obtain the second coefficient of proportionality, where the first coefficient of proportionality indicates ratios of timeslots occupied by the service at the first frequency band and the service at the second frequency band in the $N^{th}$ adjustment period;

if there is service accumulation only in uplink, on a basis of the first coefficient of proportionality, increase the timeslot percentage corresponding to the service at the second frequency band by a sixth step and reduce the timeslot percentage corresponding to the service at the first frequency band by the sixth step, so as to obtain the second coefficient of proportionality;

if there is service accumulation in both uplink and downlink, determine that the second coefficient of proportionality is equal to the first coefficient of proportionality;

if there is no service accumulation in uplink and downlink, compare uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increase the timeslot percentage corresponding to the service at the first frequency band by the fifth step and reduce the timeslot percentage corresponding to the service at the second frequency band by the fifth step, so as to obtain the second coefficient of proportionality;

if a value of the uplink receiving data volume minus the downlink receiving data volume is greater than or equal to the first difference, on a basis of the first coefficient of proportionality, increase the timeslot percentage corresponding to the service at the second frequency band by the sixth step and reduce the timeslot percentage corresponding to the service at the first frequency band by the sixth step, so as to obtain the second coefficient of proportionality; and if an absolute value of the difference between the uplink receiving data volume and the downlink receiving data volume is less than the first difference, determine that the second coefficient of proportionality is equal to the first coefficient of proportionality.

Further, the determining module 62 is configured to:
if $$\frac{R_{up} - R_{down}}{R_{up} + R_{down}} \in [-1, -B_{TH}],$$

determine that the difference between the downlink receiving data volume and the uplink receiving data volume is greater than or equal to the first difference;
if $$\frac{R_{up} - R_{down}}{R_{up} + R_{down}} \in [B_{TH}, 1],$$

determine that the difference between the uplink receiving data volume and the downlink receiving data volume is greater than or equal to the first difference; and
if $$\frac{R_{up} - R_{down}}{R_{up} + R_{down}} \in (-B_{TH}, B_{TH}),$$

determine that the absolute value of the difference between the uplink receiving data volume and the downlink receiving data volume is less than the first difference; where $B_{TH}$ is a preset value in a value range of (0,1).

The apparatus according to this embodiment may be configured to implement the technical solutions of the method embodiment shown in FIG. 1. The implementation principle and technical effects are similar to those in the method embodiment, and details are not described herein again.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium may be: any medium that can store program code, such as a ROM (read-only memory), a RAM (random access memory), a magnetic disc, or an optical disc. For example, the driver 12 may be the program. The driver 12 may also be implemented in a manner of combining a software program and hardware.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A dual band adaptive concurrent processing method, applied to a wireless local area network (WLAN) device, wherein the WLAN device comprises a first channel for transmitting a service at a first frequency band and a second channel for transmitting a service at a second frequency band, and the method comprises:

acquiring statistical information of the services at the first and second frequency bands in an $N^{th}$ adjustment period, wherein the statistical information (a) indicates service performance of the services at the frequency bands in the adjustment period and (b) comprises a maximum voice service scheduling delay when the services of the first and second frequency bands are both voice services;

determining, according to the statistical information, and a quality of service (QoS) requirement of the services at the first and second frequency bands, a second coefficient of proportionality between timeslots occupied by the services at the first and second frequency bands in an $(N+1)^{th}$ adjustment period, where the second coefficient is determined by determining whether maximum voice service scheduling delays of the services at the first and second frequency band are less than a first threshold that is a maximum scheduling delay required by voice service quality; and if both the maximum voice service scheduling delays of services at the first and second frequency bands are less than the first threshold, determining that the second coefficient of proportionality between the timeslots occupied by the services at the first and second frequency bands in the $(N+1)^{th}$ adjustment period is equal to a first coefficient of proportionality that indicates a ratio between the timeslots occupied by the services at the first and second frequency bands in the $N^{th}$ adjustment period;

otherwise, determining whether a difference between the maximum voice service scheduling delays of the services at the first and second frequency bands is less than a preset second threshold;

if the difference is less than the second threshold, determining that the second coefficient of proportionality is equal to the first coefficient of proportionality; and if the difference is greater than or equal to the second threshold, on a basis of the first coefficient of proportionality, increasing a timeslot percentage corresponding to the service at the first frequency band by a first step and reducing a timeslot percentage corresponding to the service at the second frequency band by the first step, so as to obtain the second coefficient of proportionality, wherein the maximum voice service scheduling delay of the service at the first frequency band is greater than the maximum voice service scheduling delay of the service at the second frequency band; and performing switching control on the first channel and the second channel in the $(N+1)^{th}$ adjustment period according to the determined second coefficient of proportionality, so that a ratio between communicating timeslots of the first and second channels in the $(N+1)^{th}$ adjustment period is equal to the second coefficient of proportionality.

2. The method according to claim 1, wherein if the services at the first and second frequency bands transmitted by the WLAN device are video services, the statistical information comprises the maximum video service scheduling delay; and determining the second coefficient of proportionality between timeslots occupied by the services at the first and second frequency bands in the $(N+1)^{th}$ adjustment period comprises:

determining whether the maximum video service scheduling delays of the services at the first and second frequency bands are less than a third threshold that is a maximum scheduling delay required by video service quality; and if the maximum video service scheduling delays of the services at the first and second frequency bands are less than the third threshold, determining that the second coefficient of proportionality between the timeslots occupied by the services at the first and second frequency bands in the $(N+1)^{th}$ adjustment period is equal to a first coefficient of proportionality, wherein the first coefficient of proportionality indicates a ratio between the timeslots occupied by the services at the first and second frequency bands in the $N^{th}$ adjustment period;

otherwise, determining whether a difference between the maximum video service scheduling delays of the services at the first and second frequency bands is less than a preset fourth threshold;

if the difference is less than the fourth threshold, determining that the second coefficient of proportionality is equal to the first coefficient of proportionality; and if the difference is greater than or equal to the fourth threshold, on a basis of the first coefficient of proportionality, increasing a timeslot percentage corresponding to the service at the first band by a second step and reducing a timeslot percentage corresponding to the service at the second frequency band by the second step, so as to obtain the second coefficient of proportionality, wherein the maximum video service scheduling delay of the service at the first frequency band is greater than the maximum video service scheduling delay of the service at the second frequency band.

3. The method according to claim 1, wherein if the services at the first and second frequency bands that are transmitted by the WLAN device are data services, the statistical information comprises a quantity of low-bandwidth data service users; and determining the second coefficient of proportionality comprises:

determining whether quantities of low-bandwidth data service users of the services at the first and second frequency bands are 0; and if the quantities of low-bandwidth data service users of the services at the first and second frequency bands are 0, determining that the second coefficient of proportionality between the timeslots occupied by the services at the first and second frequency bands in the $(N+1)^{th}$ adjustment period is equal to a first coefficient of proportionality, wherein the first coefficient of proportionality indicates a ratio between the timeslots occupied by the services at the first and second frequency bands in the $N^{th}$ adjustment period;

otherwise, determining whether the quantity of low-bandwidth data service users of the service at the first band is equal to the quantity of low-bandwidth data service users of second frequency band;

if the quantities of low-bandwidth data service users of the services at the first and second frequency bands are equal, determining that the first and second coefficients of proportionality are equal; and if the quantities of low-bandwidth data service users of the services at the first and second frequency bands are not equal, on a basis of the first coefficient of proportionality, increasing a timeslot percentage corresponding to the service at the first frequency band by a third step and reducing a timeslot percentage corresponding to the service at the second frequency band by the third step, so as to obtain the second coefficient of proportionality, wherein the quantity of low-bandwidth data service users of the service at the first band is greater than the quantity of low-bandwidth data service users of the service at the second frequency band.

4. The method according to claim 1, wherein if when both the services at the first and second frequency bands transmitted by the WLAN device comprise at least one service of: a voice service, a video service, and a data service, the statistical information comprises at least one of a maximum voice service scheduling delay, a maximum video service scheduling delay, a quantity of low-bandwidth data service users, and a total uplink and downlink throughput; and determining the second coefficient of proportionality comprises:

S201. determining whether maximum voice service scheduling delays of the services at the first and second frequency bands are less than a first threshold, wherein the first threshold is a maximum scheduling delay required by voice service quality; and if the maximum voice service scheduling delays of the services at the first and second frequency bands are less than the first threshold, performing S205; otherwise, performing S202;

S202. determining whether a difference between the maximum voice service scheduling delays of the services at the first and second frequency bands is less than a preset second threshold; and if the difference is less than the second threshold, performing S203; otherwise, performing S204;

S203. determining that the second coefficient of proportionality is equal to a first coefficient of proportionality, wherein the first coefficient of proportionality indicates ratios of timeslots occupied by the services at the first and second frequency bands in the $N^{th}$ adjustment period;

S204. on a basis of the first coefficient of proportionality, increasing a timeslot percentage corresponding to the service at the first frequency band by a first step and reducing a timeslot percentage corresponding to the service at the second frequency band by the first step, so as to obtain the second coefficient of proportionality, wherein the maximum voice service scheduling delay of the service at the first frequency band is greater than the maximum voice service scheduling delay of the service at the second frequency band;

S205. determining whether maximum video service scheduling delays of the services at the first and second frequency bands are less than a third threshold, wherein the third threshold is a maximum scheduling delay required by video service quality; and if the maximum video service scheduling delays of the services at the first and second frequency bands are less than the third threshold, performing S208; otherwise, performing S206;

S206. determining whether a difference between the maximum video service scheduling delays of the services at the first and second frequency bands is less than a preset fourth threshold; and if the difference is less than the fourth threshold, performing S203; otherwise, performing S207;

S207. on a basis of the first coefficient of proportionality, increasing the timeslot percentage corresponding to the service at the first frequency band by a second step and reducing the timeslot percentage corresponding to the service at the second frequency band by the second step, so as to obtain the second coefficient of proportionality, wherein the maximum video service scheduling delay of the service at the first frequency band is greater than the maximum video service scheduling delay of the service at the second frequency band;

S208. determining whether quantities of low-bandwidth data service users of the services at the first and second frequency bands are 0; and if the quantities of low-bandwidth data service users of the services at the first and second frequency bands are 0, performing S211; otherwise, performing S209;

S209. determining whether the quantities of low-bandwidth data service users of the services at the first and second frequency bands are equal; and if the quantities of low-bandwidth data service users of the services at the first and second frequency bands are equal, performing S203; otherwise, performing S210;

S210. on a basis of the first coefficient of proportionality, increasing the timeslot percentage corresponding to the service at the first frequency band by a third step and reducing the timeslot percentage corresponding to the service at the second frequency band by the third step, so as to obtain the second coefficient of proportionality, wherein the quantity of low-bandwidth data service users of the service at the first frequency band is greater than the quantity of low-bandwidth data service users of the service at the second frequency band;

S211. determining whether a difference between total uplink and downlink throughputs of the service at the first band and second frequency band is less than a preset fifth threshold; and if the difference is less than the fifth threshold, performing S203; otherwise, performing S212; and S212. on a basis of the first coefficient of proportionality, increasing the timeslot percentage corresponding to the service at the first band by a fourth step and reducing the timeslot percentage corresponding to second frequency band by the fourth step, so as to obtain the second coefficient of proportionality, wherein the total uplink and downlink throughput of the service at the first band is greater than the total uplink and downlink throughput of second frequency band.

5. The method according to claim 1, wherein if the services at the first and second frequency bands transmitted by the WLAN device are data forwarding services, the statistical information comprises a downlink data volume $R_{down}$ received from an access point (AP) at the first frequency band, a data volume $L_{down}$ temporarily stored in a downlink sending queue, an uplink data volume $R_{up}$ received from a station at the second frequency band, and a data volume $L_{up}$ temporarily stored in an uplink sending queue; and determining the second coefficient comprises:
determining an uplink and downlink service accumulation situation according to $L_{down}$ and $L_{up}$, wherein if MAX $\{L_{up}, L_{down}\} < P_{TH}$, it is determined that there is no accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, wherein $P_{TH}$ is a preset threshold, and $A_{TH}$ is a preset value in a value range of (0,1);

if there is service accumulation only in downlink, on a basis of a first coefficient of proportionality, increasing a timeslot percentage corresponding to the service at the first frequency band by a fifth step and reducing a timeslot percentage corresponding to the service at the second frequency band by the fifth step, so as to obtain the second coefficient of proportionality, wherein the first coefficient of proportionality indicates a ratio between timeslots occupied by the service at the first frequency band and the service at the second frequency band in the $N^{th}$ adjustment period;

if there is service accumulation only in uplink, on a basis of a first coefficient of proportionality, increasing a timeslot percentage corresponding to the service at the second frequency band by a sixth step and reducing a timeslot percentage corresponding to the service at the first frequency band by the sixth step, so as to obtain the second coefficient of proportionality;

if there is service accumulation in both uplink and downlink, determining that the second coefficient of proportionality is equal to a first coefficient of proportionality;

if there is no service accumulation in uplink and downlink, comparing uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increasing the timeslot percentage corresponding to the service at the first frequency band by the fifth step and reducing the timeslot percentage corresponding to the service at the second frequency band by the fifth step, so as to obtain the second coefficient of proportionality; if a value of the uplink receiving data volume minus the downlink receiving data volume is greater than or equal to the first difference, on a basis of the first coefficient of proportionality, increasing the timeslot percentage corresponding to the service at the second frequency band by the sixth step and reducing the timeslot percentage corresponding to the service at the first frequency band by the sixth step, so as to obtain the second coefficient of proportionality; and if an absolute value of a difference between the uplink receiving data volume and the downlink receiving data volume is less than the first difference, determining that the second coefficient of proportionality is equal to a first coefficient of proportionality.

6. The method according to claim 5, wherein comparing uplink and downlink receiving data volumes according to $R_{down}$ and $R_{up}$ comprises:

if $$\frac{R_{up} - R_{down}}{R_{up} + R_{down}} \in [-1, -B_{TH}],$$

determining that the difference between the downlink receiving data volume and the uplink receiving data volume is greater than or equal to the first difference;

if $$\frac{R_{up} - R_{down}}{R_{up} + R_{down}} \in [B_{TH}, 1],$$

determining that the difference between the uplink receiving data volume and the downlink receiving data volume is greater than or equal to the first difference; and if $$\frac{R_{up} - R_{down}}{R_{up} + R_{down}} \in (-B_{TH}, B_{TH}),$$

determining that the absolute value of the difference between the uplink receiving data volume and the downlink receiving data volume is less than the first difference, wherein $B_{TH}$ is a preset value in a value range of (0,1).

7. A dual band adaptive concurrent processing apparatus, applied to a WLAN device, wherein the WLAN device comprises a first channel for transmitting a service at a first frequency band and a second channel for transmitting a service at a second frequency band, and the apparatus comprises a processor, and a non-transitory computer-readable storage medium including computer-executable instructions executed by the processor to perform operations comprising:

acquiring statistical information of the services at the first and second frequency bands in an $N^{th}$ adjustment period, wherein the statistical information (a) indicates service performance of the services at the frequency bands in the adjustment period and (b) comprises a maximum voice service scheduling delay when the services of the first and second frequency bands are both voice services;

determining according to the statistical information, and a quality of service (QoS) requirement of the services at the first and second frequency bands, a second coefficient of proportionality between timeslots occupied by the services at the first and second frequency bands in an $(N+1)^{th}$ adjustment period, where the second coefficient is determined by determining whether maximum voice service scheduling delays of the services at the first and second frequency band are less than a first threshold that is a maximum scheduling delay required by voice service quality; and if both the maximum voice service scheduling delays of services at the first and second frequency bands are less than the first threshold, determining that the second coefficient of proportionality between the timeslots occupied by the services at the first and second frequency bands in the $(N+1)^{th}$ adjustment period is equal to a first coefficient of proportionality that indicates a ratio between the timeslots occupied by the services at the first and second frequency bands in the $N^{th}$ adjustment period;

otherwise, determining whether a difference between the maximum voice service scheduling delays of the services at the first and second frequency bands is less than a preset second threshold;

if the difference is less than the second threshold, determining that the second coefficient of proportionality is equal to the first coefficient of proportionality; and if the difference is greater than or equal to the second threshold, on a basis of the first coefficient of proportionality, increasing a timeslot percentage corresponding to the service at the first band by a first step and reducing a timeslot percentage corresponding to the service at the second frequency band by the first step, so as to obtain the second coefficient of proportionality, wherein the maximum voice service scheduling delay of the service at the first frequency band is greater than the maximum voice service scheduling delay of the service at the second frequency band; and performing switching control on the first channel and the second channel in the $(N+1)^{th}$ adjustment period according to the determined second coefficient of proportionality, so that a ratio between communicating timeslots of the first and second channels in the $(N+1)^{th}$ adjustment period is equal to the second coefficient of proportionality.

8. The apparatus according to claim 7, wherein if the services at the first and second frequency bands transmitted by the WLAN device are video services, the statistical information comprises a maximum video service scheduling delay; and when the processor determines the second coefficient of proportionality, the operations of the processor further comprise:

determining whether maximum video service scheduling delays of the services at the first and second frequency bands are less than a third threshold, wherein the third threshold is a maximum scheduling delay required by video service quality; and if the maximum video service scheduling delays of the services at the first and second frequency bands are less than the third threshold, determining that the second coefficient of proportionality between the timeslots occupied by the services at the first and second frequency bands in the $(N+1)^{th}$ adjustment period is equal to a first coefficient of proportionality, wherein the first coefficient of proportionality indicates ratios of timeslots occupied by the services at the first and second frequency bands in the $N^{th}$ adjustment period;

otherwise, determining whether a difference between the maximum video service scheduling delays of the services at the first and second frequency bands is less than a preset fourth threshold;

if the difference is less than the fourth threshold, determining that the first and second coefficients of proportionality are equal; and if the difference is greater than or equal to the fourth threshold, on a basis of the first coefficient of proportionality, increasing a timeslot percentage corresponding to the service at the first frequency band by a second step and reducing a timeslot percentage corresponding to the service at the second frequency band by the second step, so as to obtain the second coefficient of proportionality, wherein the maximum video service scheduling delay of the service at the first frequency band is greater than the maximum video service scheduling delay of the service at the second frequency band.

9. The apparatus according to claim 7, wherein if both the service at the first frequency band and the service at the second frequency band that are transmitted by the WLAN device are data services, the statistical information comprises a quantity of low-bandwidth data service users; and when the processor determines the second coefficient of proportionality, the operations of the processor further comprise:

determining whether quantities of low-bandwidth data service users of the services at the first and second frequency bands are 0; and if the quantities of low-bandwidth data service users of the services at the first and second frequency bands are 0, determining that the second coefficient of proportionality between the timeslots occupied by the services at the first and second frequency bands in the $(N+1)^{th}$ adjustment period is equal to a first coefficient of proportionality, wherein the first coefficient of proportionality indicates a ratio between the timeslots occupied by the services at the first and second frequency bands in the $N^{th}$ adjustment period;

otherwise, determining whether the quantity of low-bandwidth data service users of the service at the first frequency band is equal to the quantity of low-bandwidth data service users of the service at the second frequency band;

if the quantities of low-bandwidth data service users of the services at the first and second frequency bands are equal, determining that the first and second coefficients of proportionality are equal to the first coefficient of proportionality; and if the quantities of low-bandwidth data service users of the services at the first and second frequency bands are not equal, on a basis of the first coefficient of proportionality, increasing the timeslot percentage corresponding to the service at the first frequency band by a third step and reducing the timeslot percentage corresponding to the service at the second frequency band by the third step, so as to obtain the second coefficient of proportionality, wherein the quantity of low-bandwidth data service users of the service at the first frequency band is greater than the quantity of low-bandwidth data service users of the service at the second frequency band.

10. The apparatus according to claim 7, wherein if both the service at the first frequency band and the service at the second frequency band that are transmitted by the WLAN device comprise at least one service of: a voice service, a video service, and a data service, the statistical information comprises at least one of a maximum voice service scheduling delay, a maximum video service scheduling delay, a quantity of low-bandwidth data service users, and a total uplink and downlink throughput; and wherein determining the second coefficient of proportionality:

S201. determining whether maximum voice service scheduling delays of the services at the first and second frequency bands are less than a first threshold, wherein the first threshold is a maximum scheduling delay required by voice service quality; and if both the maximum voice service scheduling delays of the services at the first and second frequency bands are less than the first threshold, performing S205; otherwise, performing S202;

S202. determining whether a difference between the maximum voice service scheduling delays of the services at the first and second frequency bands is less than a preset second threshold; if the difference is less than the second threshold, performing S203; otherwise, performing S204;

S203. determining that the second coefficient of proportionality is equal to a first coefficient of proportionality, wherein the first coefficient of proportionality indicates ratios of timeslots occupied by the services at the first and second frequency bands in the $N^{th}$ adjustment period;

S204. on a basis of the first coefficient of proportionality increasing a timeslot percentage corresponding to the service at the first frequency band by a first step and reduce a timeslot percentage corresponding to the service at the second frequency band by the first step, so as to obtain the second coefficient of proportionality, wherein the maximum voice service scheduling delay of the service at the first frequency band is greater than the maximum voice service scheduling delay of the service at the second frequency band;

S205. determining whether maximum video service scheduling delays of the services at the first and second frequency bands are less than a third threshold, wherein the third threshold is a maximum scheduling delay required by video service quality; and if the maximum video service scheduling delays of the services at the first and second frequency bands are less than the third threshold, performing S208; otherwise performing S206;

S206. determining whether a difference between the maximum video service scheduling delays of the services at the first and second frequency bands is less than a preset fourth threshold; and if the difference is less than the fourth threshold, performing S203; otherwise, performing S207;

S207. on a basis of the first coefficient of proportionality, increasing the timeslot percentage corresponding to the service at the first frequency band by a second step and reduce the timeslot percentage corresponding to the service at the second frequency band by the second step, so as to obtain the second coefficient of proportionality, wherein the maximum video service scheduling delay of the service at the first frequency band is greater than the maximum video service scheduling delay of the service at the second frequency band;

S208. determining whether quantities of low-bandwidth data service users of the services at the first and second frequency bands are 0; and if both the quantities of low-bandwidth data service users of the services at the first and second frequency bands are 0, performing S211; otherwise, performing S209;

S209. determining whether the quantities of low-bandwidth data service users of the services at the first and second frequency bands are equal; and if the quantities of low-bandwidth data service users of the services at the first and second frequency bands are equal, performing S203; otherwise, performing S210;

S210. on a basis of the first coefficient of proportionality, increasing the timeslot percentage corresponding to the service at the first frequency band by a third step and reduce the timeslot percentage corresponding to the service at the second frequency band by the third step, so as to obtain the second coefficient of proportionality, wherein the quantity of low-bandwidth data service users of the service at the first frequency band is greater than the quantity of low-bandwidth data service users of the service at the second frequency band;

S211. determining whether a difference between total uplink and downlink throughputs of the service at the first band and second frequency band is less than a preset fifth threshold; and if the difference is less than the fifth threshold, performing S203; otherwise, performing S212; and S212. on a basis of the first coefficient of proportionality, increasing the timeslot percentage corresponding to the service at the first frequency band by a fourth step and reduce the timeslot percentage corresponding to the service at the second frequency band by the fourth step, so as to obtain the second coefficient of proportionality, wherein the total uplink and downlink throughput of the service at the first frequency band is greater than the total uplink and downlink throughput of the service at the second frequency band.

11. The apparatus according to claim 7, wherein if the service at the first frequency band and the service at the second frequency band that are transmitted by the WLAN device are data forwarding services, the statistical information comprises a downlink data volume $R_{down}$ received from an access point (AP) at the first frequency band, a data volume $L_{down}$ temporarily stored in a downlink sending queue, an uplink data volume $R_{up}$ received from a station at the second frequency band, and a data volume $L_{up}$ temporarily stored in an uplink sending queue; and wherein determining the second coefficient of proportionality comprises:

determining an uplink and downlink service accumulation situation according to $L_{down}$ and $L_{up}$, wherein if MAX$\{L_{up}, L_{down}\}<P_{TH}$, it is determined that there is no accumulation in uplink and downlink; otherwise, if $$\frac{L_{up} - L_{down}}{L_{up} + L_{down}} \in [-1, -A_{TH}],$$

there is accumulation only in downlink; if $$\frac{L_{up} - L_{down}}{L_{up} + L_{down}} \in [A_{TH}, 1],$$

there is accumulation only in uplink; and if $$\frac{L_{up} - L_{down}}{L_{up} + L_{down}} \in (-A_{TH}, A_{TH}),$$

there is accumulation in both uplink and downlink, wherein $P_{TH}$ is a preset threshold, and $A_{TH}$ is a preset value in a value range of (0,1);

if there is service accumulation only in downlink, on a basis of a first coefficient of proportionality, increasing a timeslot percentage corresponding to the service at the first frequency band by a fifth step and reducing a timeslot percentage corresponding to the service at the second frequency band by the fifth step, so as to obtain the second coefficient of proportionality, wherein the first coefficient of proportionality indicates ratios of timeslots occupied by the service at the first frequency band and the service at the second frequency band in the $N^{th}$ adjustment period;

if there is service accumulation only in uplink, on a basis of a first coefficient of proportionality, increasing the timeslot percentage corresponding to the service at the second frequency band by a sixth step and reducing the timeslot percentage corresponding to the service at the first frequency band by the sixth step, so as to obtain the second coefficient of proportionality;

if there is service accumulation in both uplink and downlink, determining that the second coefficient of proportionality is equal to a first coefficient of proportionality;

if there is no accumulation in uplink and downlink, comparing uplink and downlink receiving data volumes according to $R_{down}$ and $R_{up}$;

if a value of the downlink receiving data volume minus the uplink receiving data volume is greater than or equal to a preset first difference, on a basis of the first coefficient of proportionality, increasing the timeslot percentage corresponding to the service at the first band by the fifth step and reducing the timeslot percentage corresponding to the service at the second frequency band by the fifth step, so as to obtain the second coefficient of proportionality;

if a value of the uplink receiving data volume minus the downlink receiving data volume is greater than or equal to the first difference, on a basis of the first coefficient of proportionality, increasing the timeslot percentage corresponding to the service at the second frequency band by the sixth step and reducing the timeslot percentage corresponding to the service at the first frequency band by the sixth step, so as to obtain the second coefficient of proportionality; and if an absolute value of a difference between the uplink receiving data volume and the downlink receiving data volume is less than the first difference, determining that the second coefficient of proportionality is equal to a first coefficient of proportionality.

12. The apparatus according to claim 11, wherein determining the second coefficient of proportionality further comprises:

if $$\frac{R_{up} - R_{down}}{R_{up} + R_{down}} \in [-1, -B_{TH}],$$

determining that the difference between the downlink receiving data volume and the uplink receiving data volume is greater than or equal to the first difference;

if $$\frac{R_{up} - R_{down}}{R_{up} + R_{down}} \in [B_{TH}, 1],$$

determining that the difference between the uplink receiving data volume and the downlink receiving data volume is greater than or equal to the first difference; and if $$\frac{R_{up} - R_{down}}{R_{up} + R_{down}} \in (-B_{TH}, B_{TH}),$$

determining that the absolute value of the difference between the uplink receiving data volume and the downlink receiving data volume is less than the first difference, wherein $B_{TH}$ is a preset value in a value range of (0,1).

* * * * *

UNITED STATES PATENT AND TRADEMARK OFFICE
CERTIFICATE OF CORRECTION

PATENT NO. : 9,844,069 B2
APPLICATION NO. : 14/821419
DATED : December 12, 2017
INVENTOR(S) : Gao et al.

It is certified that error appears in the above-identified patent and that said Letters Patent is hereby corrected as shown below:

In the Claims

Column 39, Line 38, "the first band" should read -- the first frequency band --.

Column 39, Line 67, "the first band" should read -- the first frequency band --.

Column 40, Line 1, "second frequency band" should read -- the service at the second frequency band --.

Column 40, Line 17, "the first band" should read -- the first frequency band --.

Column 41, Line 45, "the first band" should read -- the first frequency band --.

Column 41, Line 45, "second frequency band" should read -- the service at the second frequency band --.

Column 41, Line 51, "the first band" should read -- the first frequency band --.

Column 41, Line 51, "second frequency band" should read -- the service at the second frequency band --.

Column 41, Line 52, "second frequency band" should read -- the service at the second frequency band --.

Column 41, Line 56, "the first band" should read -- the first frequency band --.

Column 44, Line 26, "the first band" should read -- the first frequency band --.

Column 47, Line 16, "the first band" should read -- the first frequency band --.

Signed and Sealed this
Twenty-ninth Day of May, 2018

Andrei Iancu
*Director of the United States Patent and Trademark Office*

Column 47, Line 16, "second frequency band," should read -- the service at the second frequency band --.